US00RE50958E

(19) United States
(12) Reissued Patent
Fox

(10) Patent Number: US RE50,958 E
(45) **Date of Reissued Patent: *Jul. 21, 2026**

(54) MULTIPLE PORT BEAM BRACKET

(71) Applicant: FOX HARDWOOD LUMBER COMPANY, LLC, Franklin, TN (US)

(72) Inventor: Samuel Fox, Franklin, TN (US)

(73) Assignee: Fox Hardwood Lumber Company, LLC, Franklin, TN (US)

( * ) Notice: This patent is subject to a terminal disclaimer.

(21) Appl. No.: 18/427,047

(22) Filed: Jan. 30, 2024

Related U.S. Patent Documents

Reissue of:
(64) Patent No.: 11,236,503
Issued: Feb. 1, 2022
Appl. No.: 16/805,957
Filed: Mar. 2, 2020

U.S. Applications:
(63) Continuation of application No. 16/418,412, filed on May 21, 2019, now abandoned, which is a continuation-in-part of application No. 15/623,354, filed on Jun. 14, 2017, now Pat. No. 10,294,656.

(51) Int. Cl.
*E04B 1/26* (2006.01)
*E04C 3/12* (2006.01)

(52) U.S. Cl.
CPC .... *E04B 1/2604* (2013.01); *E04B 2001/2644* (2013.01); *E04C 3/12* (2013.01)

(58) Field of Classification Search
CPC .... E04B 1/2604; E04B 1/2608; E04B 1/2612; E04B 2001/1915; E04B 2001/2676
See application file for complete search history.

(56) References Cited

U.S. PATENT DOCUMENTS 949,394 A * 2/1910 Daly ..... E04B 1/2403 296/9
2,936,530 A * 5/1960 Bowen ..... G09B 25/04 434/72
3,097,730 A * 7/1963 Halle ..... E04B 1/2403 403/173
3,392,947 A * 7/1968 Keliehor ..... A14C 5/04 248/188.1
4,054,392 A * 10/1977 Oppenheim ..... F16B 7/18 403/175
4,398,841 A * 8/1983 Kojima ..... E04B 1/2604 403/173

(Continued)

*Primary Examiner* — Laura Davison
(74) *Attorney, Agent, or Firm* — Shane Cortesi

(57) ABSTRACT

A connection device may include a first side support, a second side support opposite the first side support, a first guide and a second guide opposite the first side support. The first guide and second guide connect the first side support to the second side support. The first guide, second guide, first side support and second side support define at least one cavity shaped to accept an upright beam. A plate may extend between the first side support, the second side support, the first guide and the second guide, in which case the plate, first guide, second guide, first side support and second side support define two cavities shaped to accept two upright beams. One or more of the first guide, second guide, first side support and second side support may include a plurality of side attachments that define side connection area(s) shaped to accept a lateral beam(s).

18 Claims, 24 Drawing Sheets

(56) References Cited

U.S. PATENT DOCUMENTS

| | | | | | |
|---|---|---|---|---|---|
| 4,423,977 | A * | 1/1984 | Gilb | F16B 9/058 | 52/702 |
| 4,589,792 | A * | 5/1986 | Niziol | F16B 12/14 | 403/231 |
| 7,827,757 | B2 * | 11/2010 | Gadd | E04B 1/2612 | 52/715 |
| 8,864,096 | B1 * | 10/2014 | Fox | E04H 12/2269 | 248/534 |
| 10,294,656 | B2 * | 5/2019 | Fox | E04B 1/2403 | |
| 2007/0004251 | A1 * | 1/2007 | McCarthy | E04H 17/168 | 439/82 |
| 2013/0232758 | A1 * | 9/2013 | Pond | F16B 7/185 | 403/361 |
| 2013/0259563 | A1 * | 10/2013 | Campbell | E04B 1/2604 | 403/188 |
| 2019/0271146 | A1 * | 9/2019 | Fox | E04B 1/2604 | |

* cited by examiner

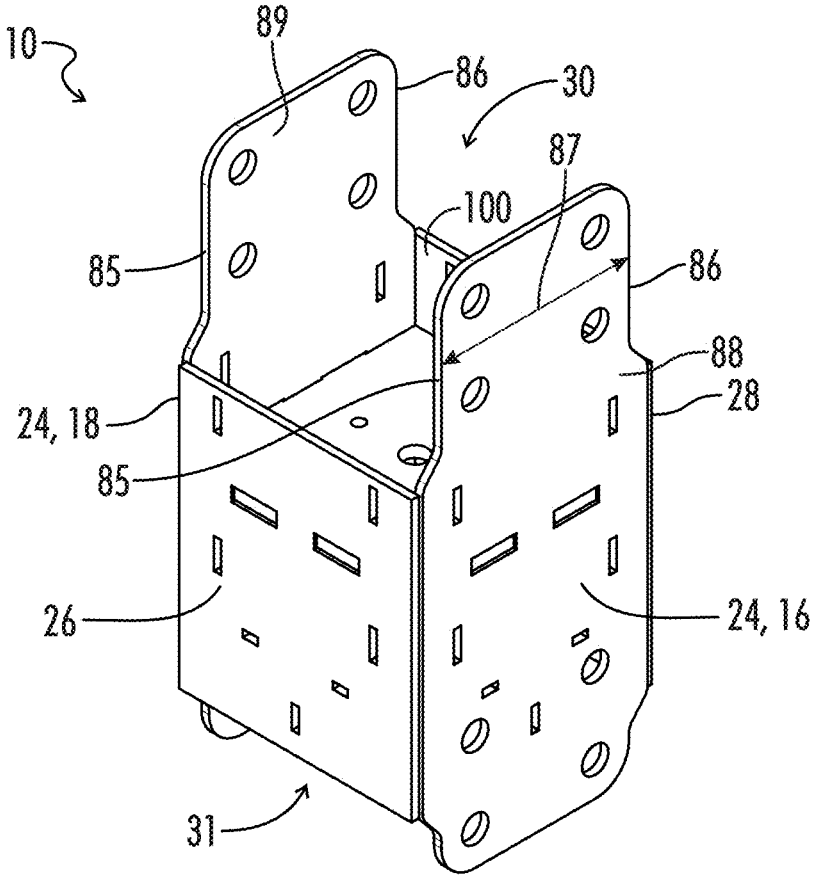
*Amended FIG. 2*

MULTIPLE PORT BEAM BRACKET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a Non-Provisional Patent Application filed by applicant Fox Hardwood Lumber Company L.L.C. for the invention by Samuel Fox, a citizen of the United States, residing in Franklin, Tennessee for a "Multiple Port Beam Bracket." This application is a continuation of U.S. patent application Ser. No. 16/418,412, filed May 21, 2019, which is a continuation-in-part of U.S. patent application Ser. No. 15/623,354, filed Jun. 14, 2017.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present invention relates generally to supports for beams or posts, and more particularly to a multiple port beam bracket for supporting a beam or post.

Various devices are known in the art that connect multiple support beams together to facilitate support of structures. Some of these prior art connection devices, or brackets, have attempted to facilitate the attachment between support features, such as support beams, used in the construction of a building, (e.g., a dwelling, home, office, barn, and the like), or even portions of a building. These prior art devices have failed to adequately allow for the installation of those brackets when multiple support beams are used, or when the support beams held by those brackets are of different materials. This is especially true for connection locations that are at the intersection of multiple support beams.

What is needed then, is a new connection device or bracket used for supporting a beam. This preferred device should facilitate the connection between multiple support beams or when the support beams are made of different materials. This preferred device should allow for easy installation of the support beam at the junction of the beams. This needed connection device is lacking in the art.

BRIEF SUMMARY OF THE INVENTION

Included herein is a connection device for supporting a plurality of beams. In some embodiments, the connection device may include a plate, a first side support and a second side support, with each side support including a top portion extending from the plate in a first direction and a bottom portion extending from the plate in a second direction substantially opposite the first direction. The connection device may include a first guide and a second guide with each guide attached to the plate and each side support. Each guide may include a top portion extending from the plate in the first direction and a bottom portion extending from the plate in the second direction. The plate, the top portions of each side support, and the top portions of each guide may define a top cavity shaped to accept one of the beams. Further, the plate, the bottom portions of each side support, and the bottom portions of each guide may define a bottom cavity shaped to accept another beam. In other embodiments, a plate is not present.

In an embodiment, the plate can include a plurality of plate openings and each side support can include a plurality of side support openings. The top portions of each side support can include at least two indented sides and the indentions on each side support are positioned, or can start, proximate either the first guide or the second guide. The bottom portions of each side support can include at least two indented sides and the indentions on each side support are positioned, or can start, proximate either the first guide or the second guide. Further, for each side support, the indented sides of the top portion of said side support can be longer than the indented sides of the bottom portion of said side support.

In an embodiment, a first set of first, second, and third side attachments can be included with each side attachment extend from one of the side supports in a direction substantially perpendicular to said side support and forming a first side connection area. A second set of first, second, and third side attachments can be included with each side attachment extending from the other side support in a direction substantially perpendicular to said side support and forming a second side connection area.

In another embodiment, the second set of first, second, and third side attachments can be alternately positioned with each side attachment extending from one of the guides in a direction substantially perpendicular to said guide and forming a second side connection area. A third set of first, second, and third side attachments can be included with each side attachment extending from the other guide in a direction substantially perpendicular to said other guide and forming a third side connection area. A fourth set of first, second, and third side attachments can be included with each side attachment extending from the other side support in a direction substantially perpendicular to said side support and forming a fourth side connection area.

It is therefore a general object of the current disclosure to provide a connection device for support beams.

Another object of the current disclosure is to provide a connection device that facilitates attachment between various beams where the beams are constructed of different material.

Another object of the present disclosure is to provide a support bracket that is both functional and aesthetically appealing.

Other and further objects, features and advantages of the present disclosure will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 2 is a perspective view of a connection device made in accordance with the current disclosure.

DETAILED DESCRIPTION OF THE INVENTION

Referring generally now to FIGS. 1-8D, a connection device is shown and generally designated by the numeral 10. The connection device 10, which can also be described as a support bracket 10, is for supporting one or more beams 12A, 12B. Preferably the connection device 10 connects multiple beams 12A, 12B where those beams 12A, 12B can be any beam known in the construction industry used to support other structures. For example, the beams 12A, 12B can be used to support any structure known in the construction industry. For example, the beams 12A, 12B may be used to connect an upper structure, such as a roof or other element above the beams 12A, 12B, to a lower structure, such as a support surface (e.g., a concrete surface, a support pillar, or a floor) of a building, such as a dwelling, home, and the like. The connection device 10 connects the beams 12A, 12B and secures the beams 12A, 12B through the connection device 10 at the junction of the beams 12A, 12B at the connection device 10. Preferably, the connection device 10 connects multiple wooden beams 12A, 12B, but each beam 12A, 12B can be composed of any known construction material. The connection device 10 may be configured such that it can accept beams 12A, 12B in the shape of rectangular prisms. In the illustrations, beams designated by the numeral 12A are upright/vertical beams that are generally parallel to the building height (and perpendicular to the ground) and beams designated by the numeral 12B are lateral beams 12B oriented generally perpendicular to the building height (and parallel to the ground).

Figure 1:
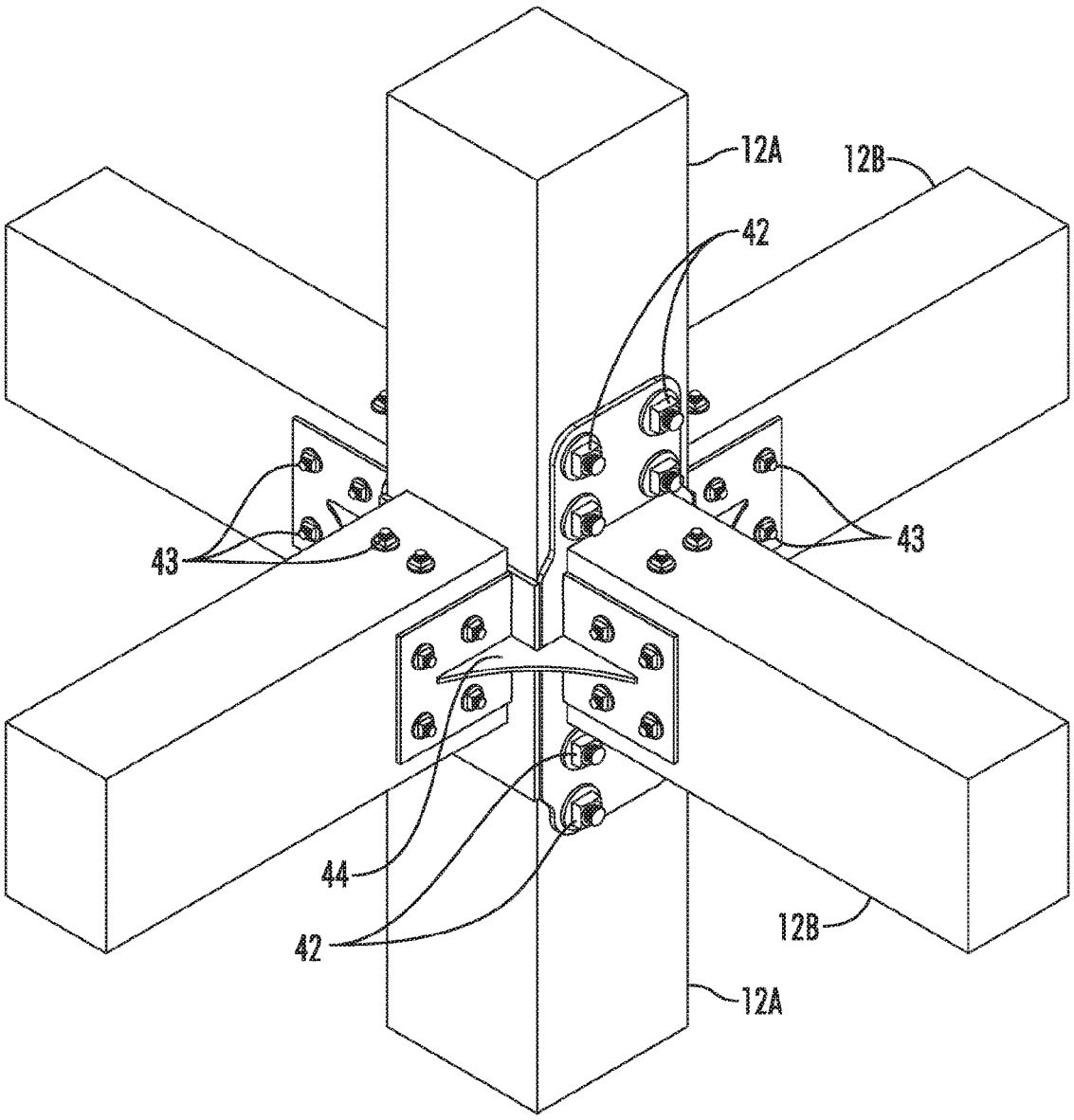
FIG. 1 is a perspective view of a connection device made in accordance with the current disclosure shown supporting multiple beams.
Figure 2A:
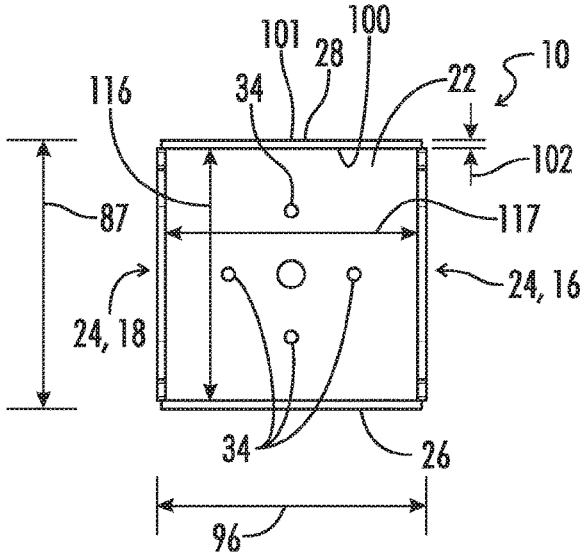
FIG. 2A is a top view of the connection device shown in FIG. 2.
Figure 2B:
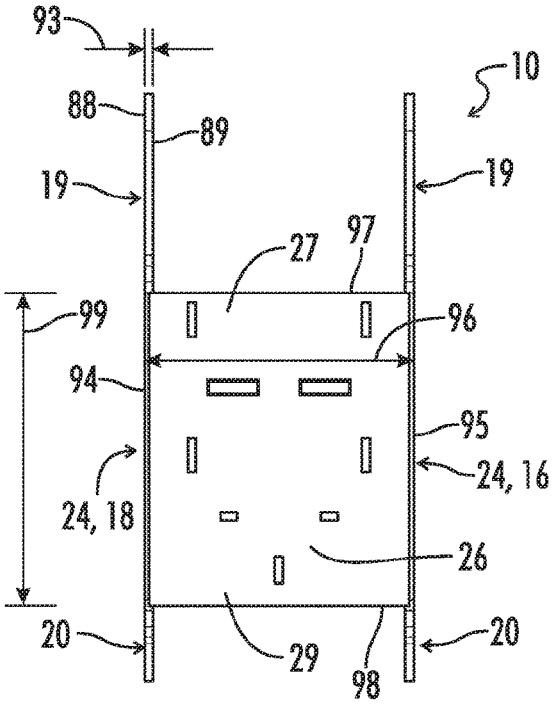
FIG. 2B is a front view of the connection device shown in FIG. 2.
Figure 2C:
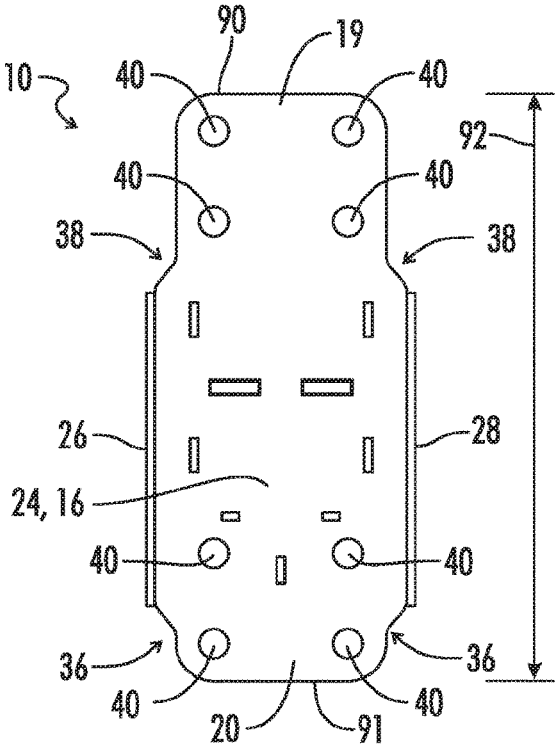
FIG. 2C is a side view of the connection device shown in FIG. 2.
Figure 3:
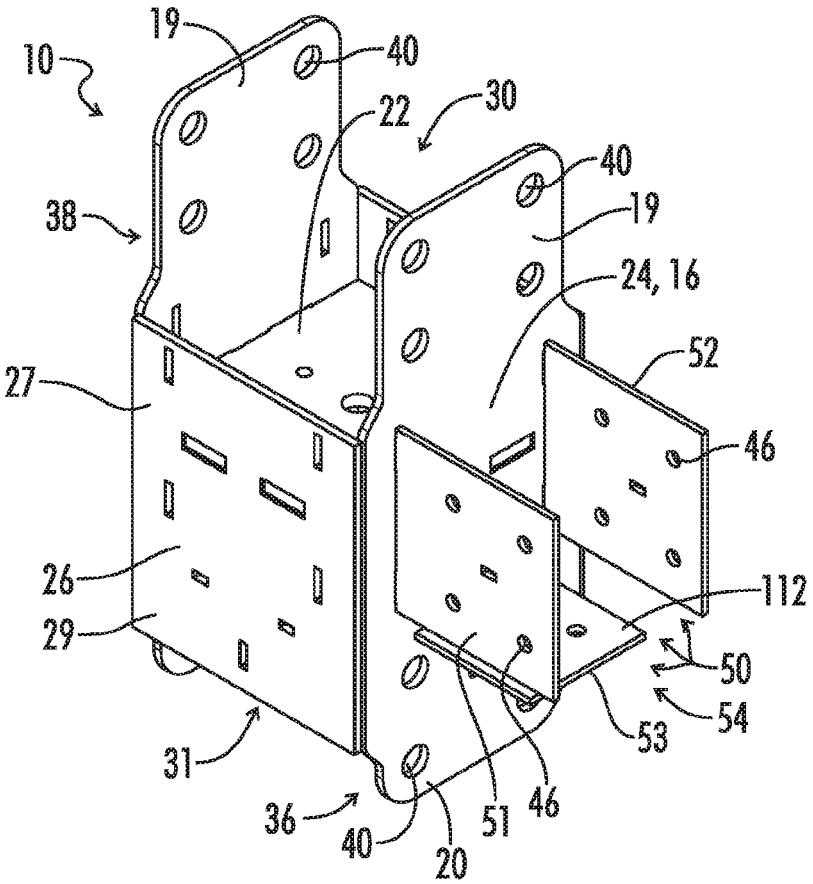
FIG. 3 is a perspective view of a connection device made in accordance with the current disclosure and having a side connection area.
Figure 3A:
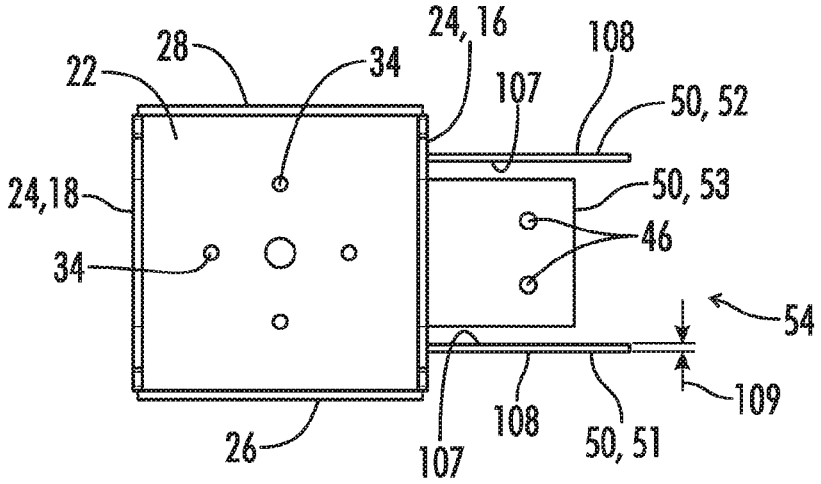
FIG. 3A is a top view of the connection device shown in FIG. 3.
Figure 3B:
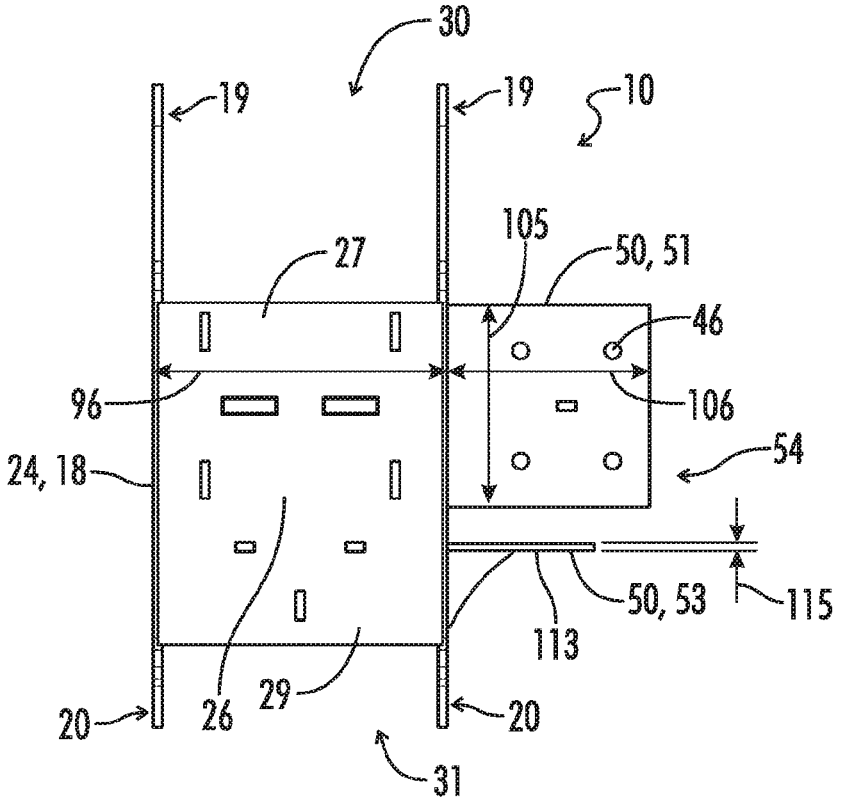
FIG. 3B is a front view of the connection device shown in FIG. 3.
Figure 3C:
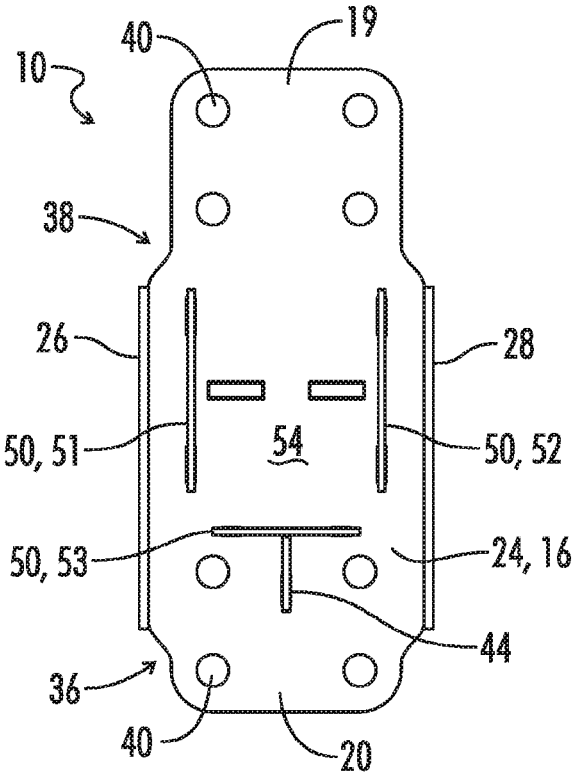
FIG. 3C is a side view of the connection device shown in FIG. 3.
Figure 4:
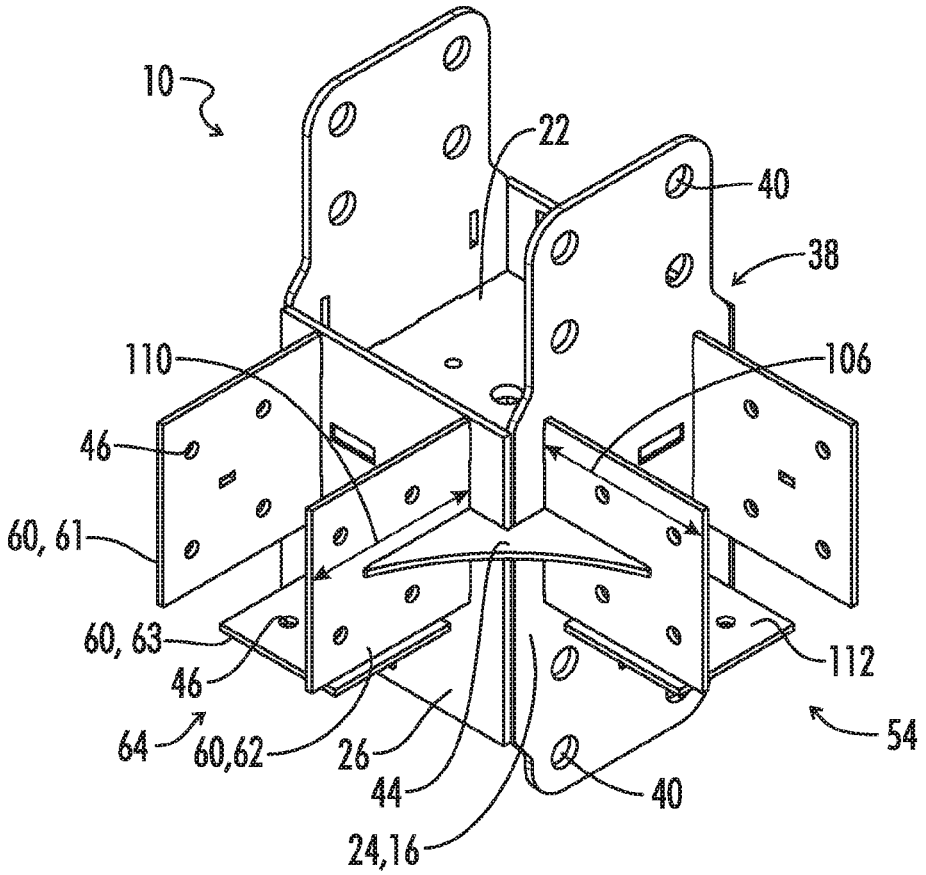
FIG. 4 is a perspective view of a connection device made in accordance with the current disclosure and having two side connection areas.
Figure 4A:
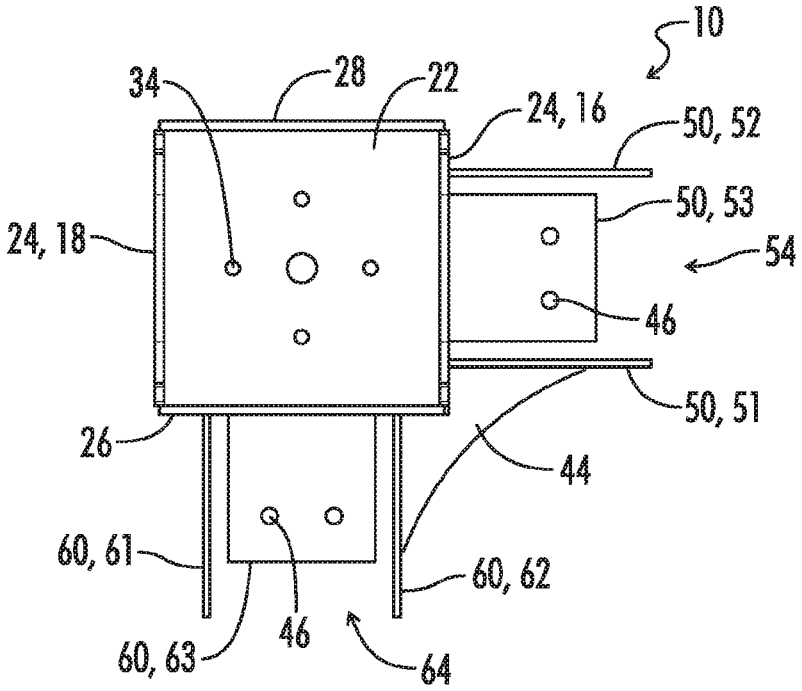
FIG. 4A is a top view of the connection device shown in FIG. 4.
Figure 4B:
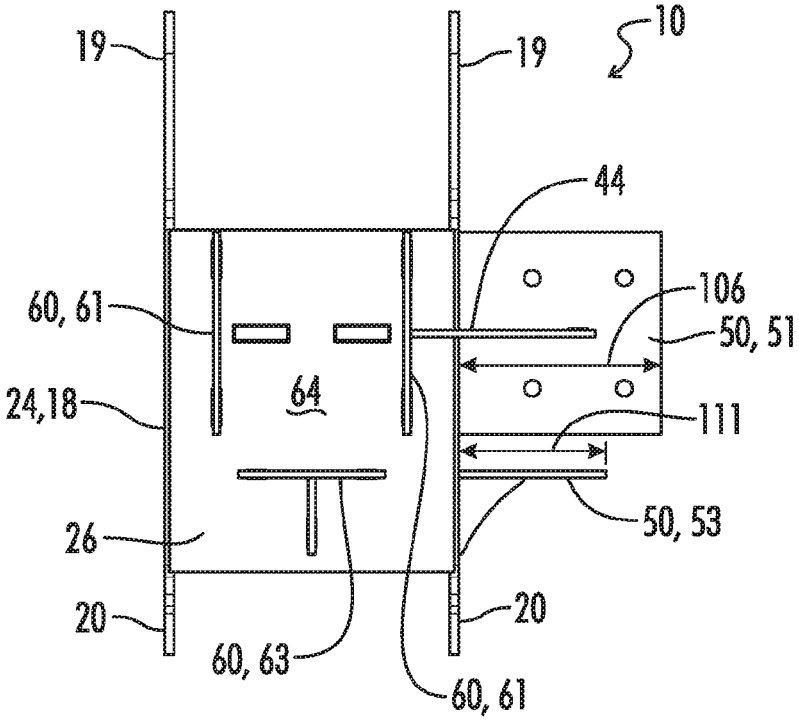
FIG. 4B is a front view of the connection device shown in FIG. 4.
Figure 4C:
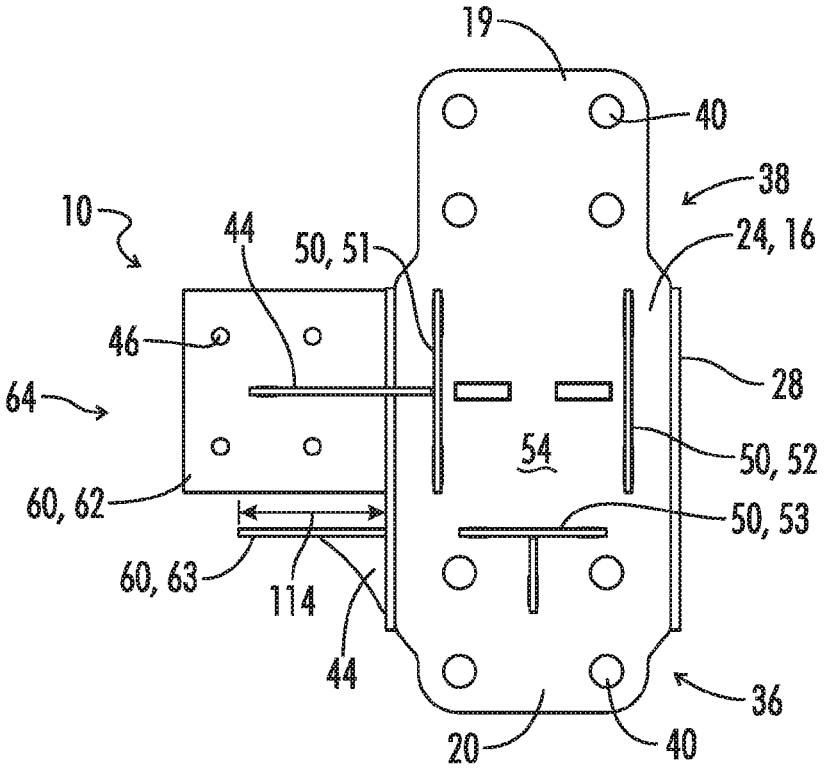
FIG. 4C is a side view of the connection device shown in FIG. 4.
Figure 5:
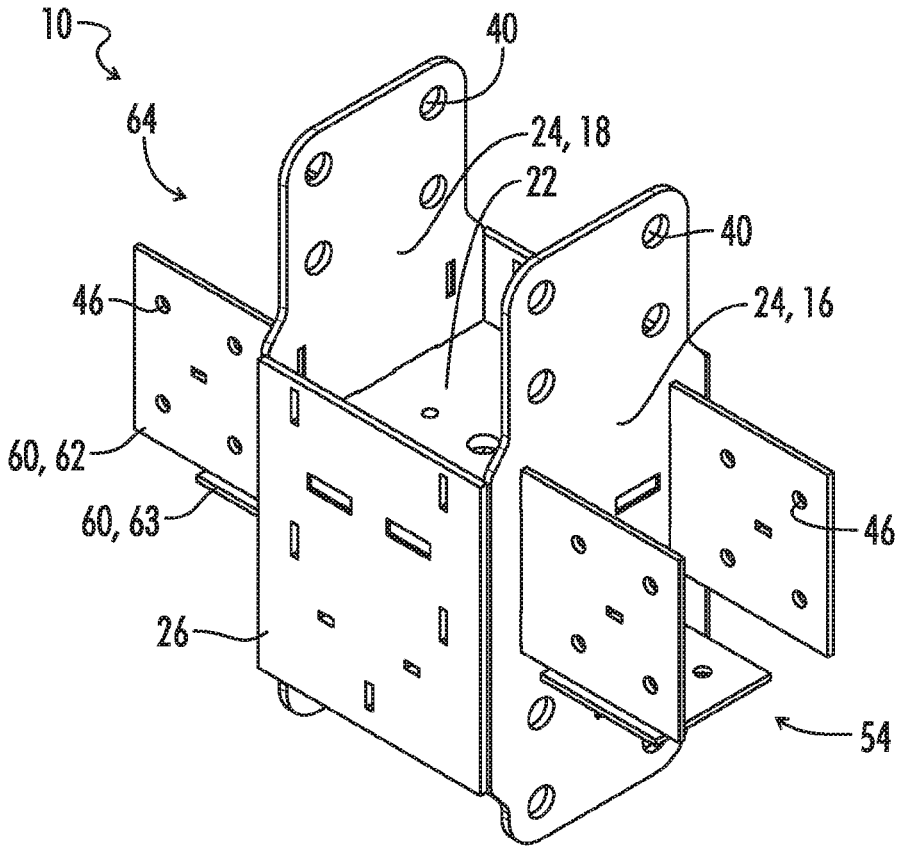
FIG. 5 is a perspective view of an alternate connection device made in accordance with the current disclosure and having two side connection areas.
Figure 5A:
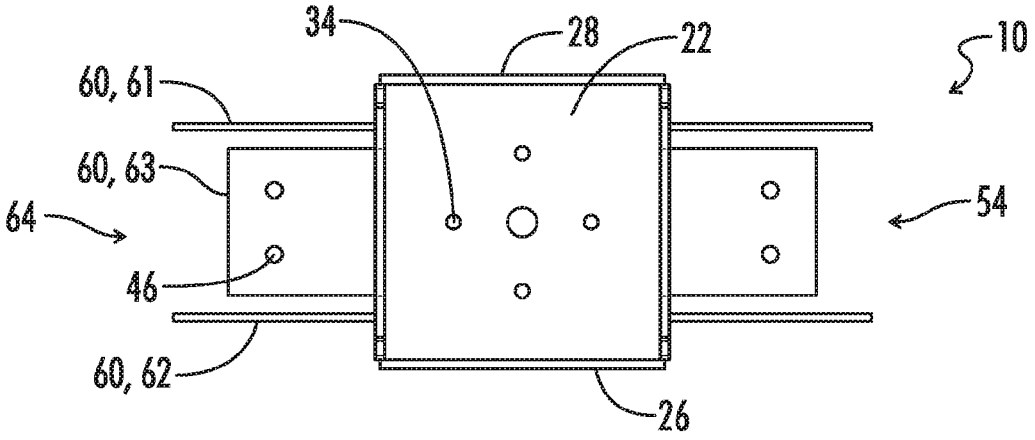
FIG. 5A is a top view of the connection device shown in FIG. 5.
Figure 5B:
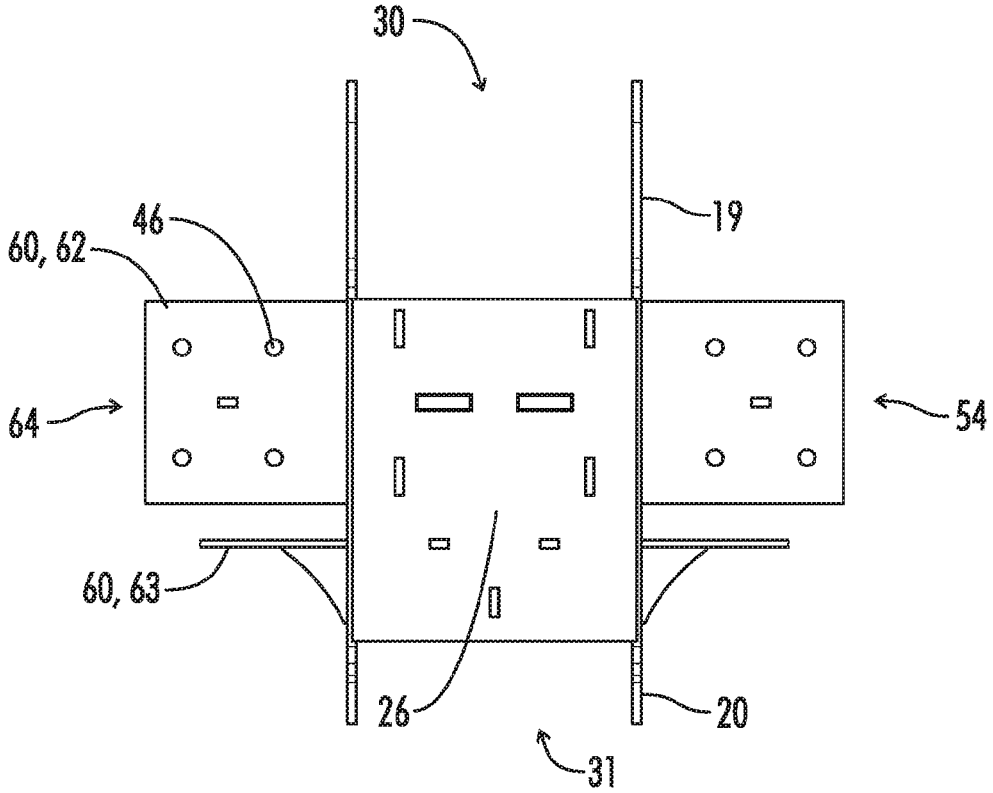
FIG. 5B is a front view of the connection device shown in FIG. 5.
Figure 5C:
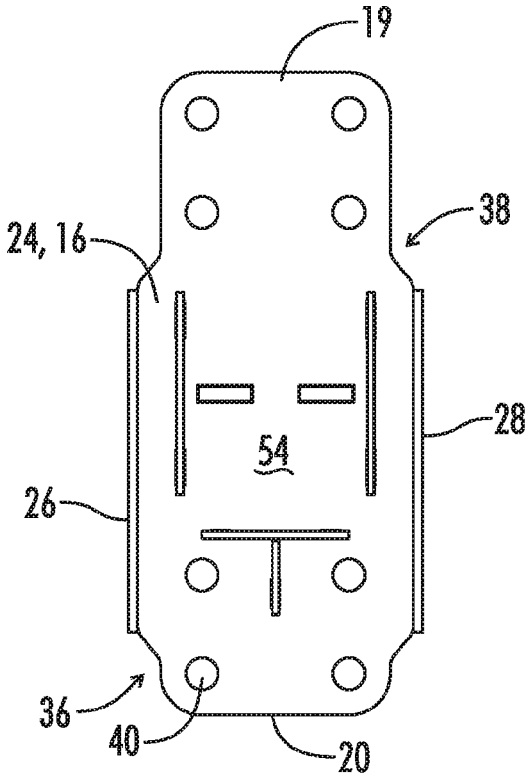
FIG. 5C is a side view of the connection device shown in FIG. 5.
Figure 6:
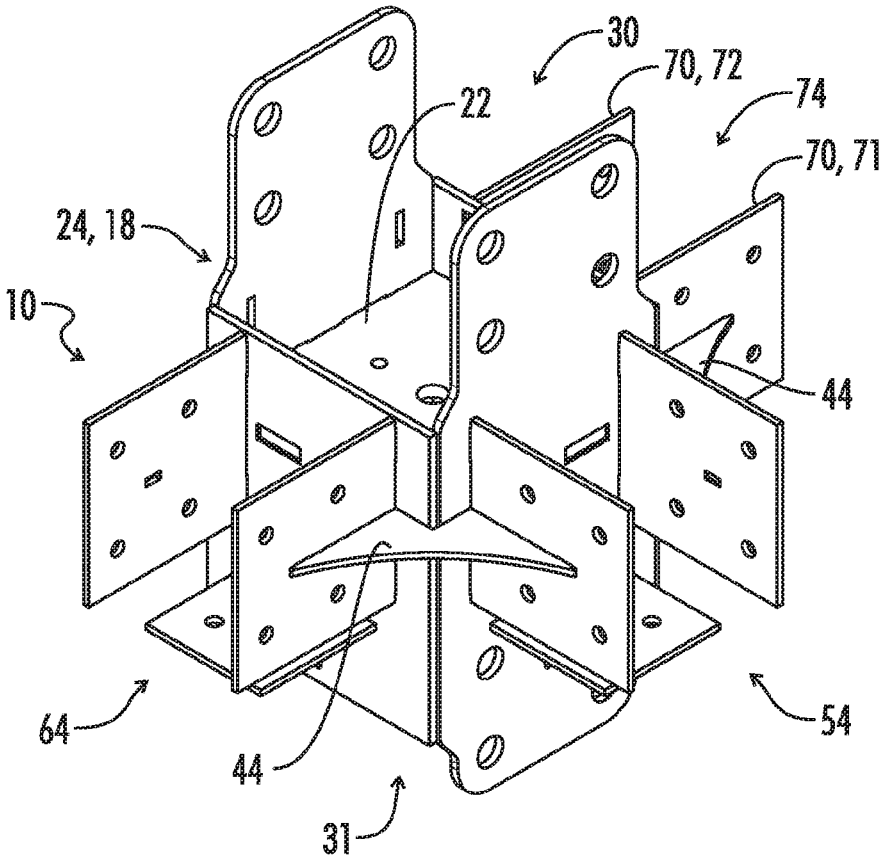
FIG. 6 is a perspective view of a connection device made in accordance with the current disclosure and having three side connection areas.
Figure 6A:
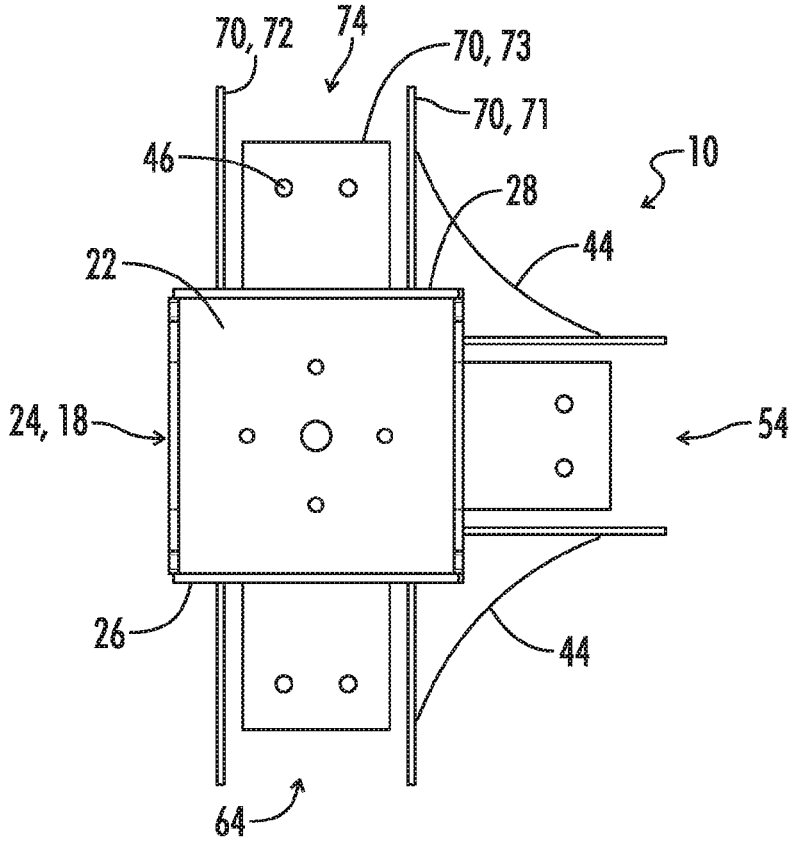
FIG. 6A is a top view of the connection device shown in FIG. 6.
Figure 6B:
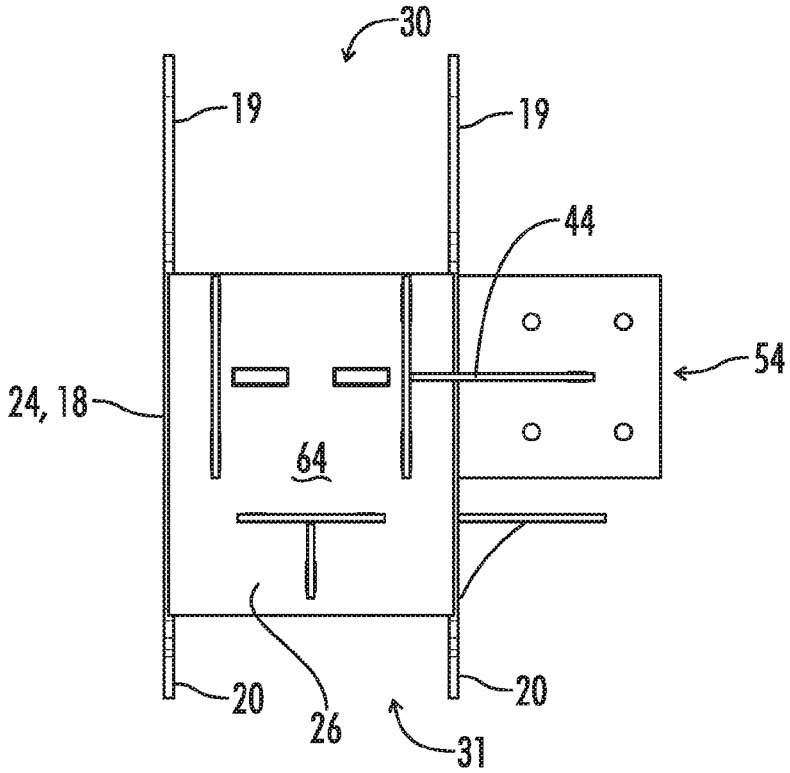
FIG. 6B is a front view of the connection device shown in FIG. 6.
Figure 6C:
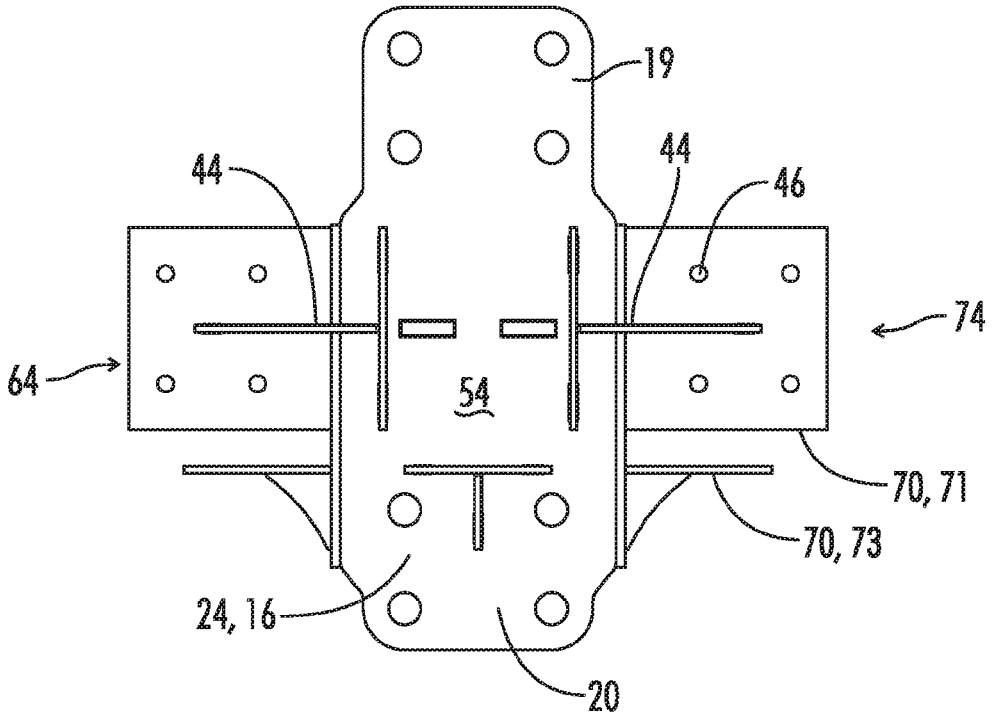
FIG. 6C is a side view of the connection device shown in FIG. 6.
Figure 7:
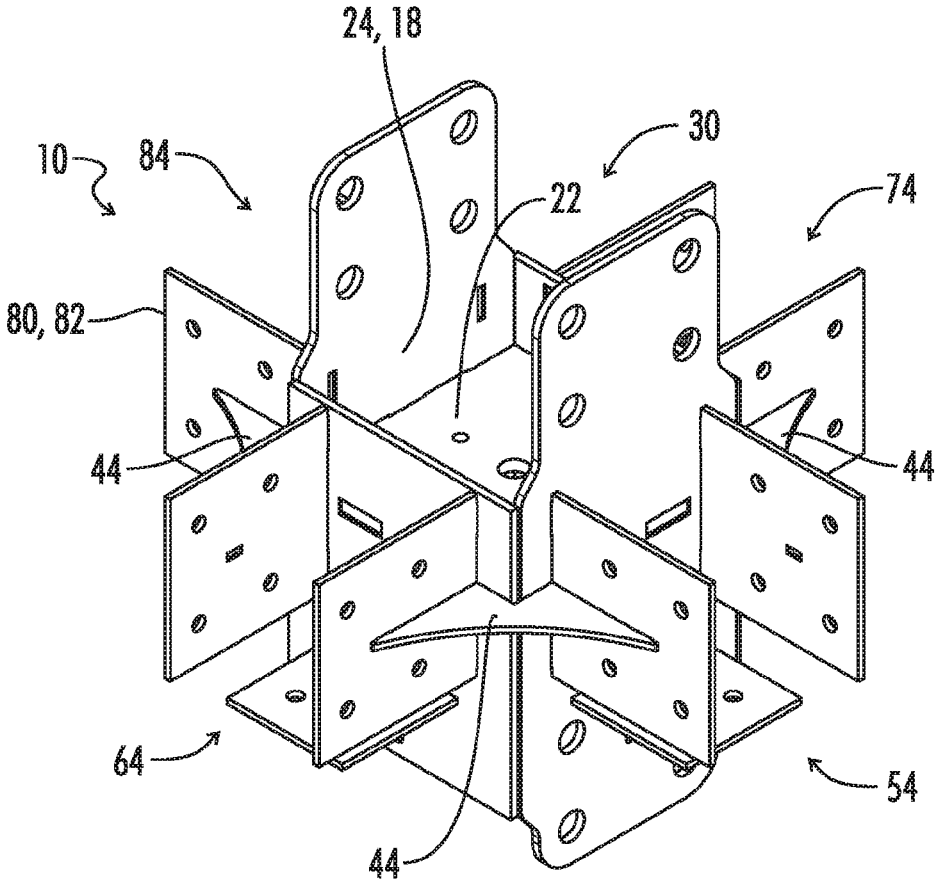
FIG. 7 is a perspective view of a connection device made in accordance with the current disclosure and having four side connection areas.
Figure 7A:
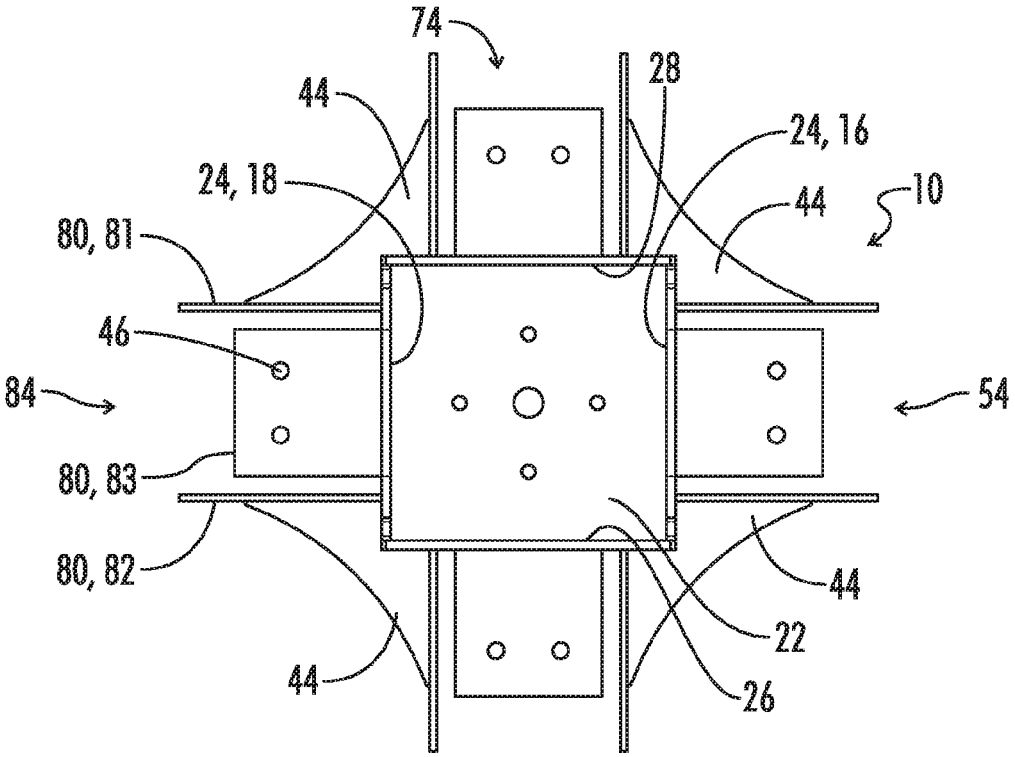
FIG. 7A is a top view of the connection device shown in FIG. 7.
Figure 7B:
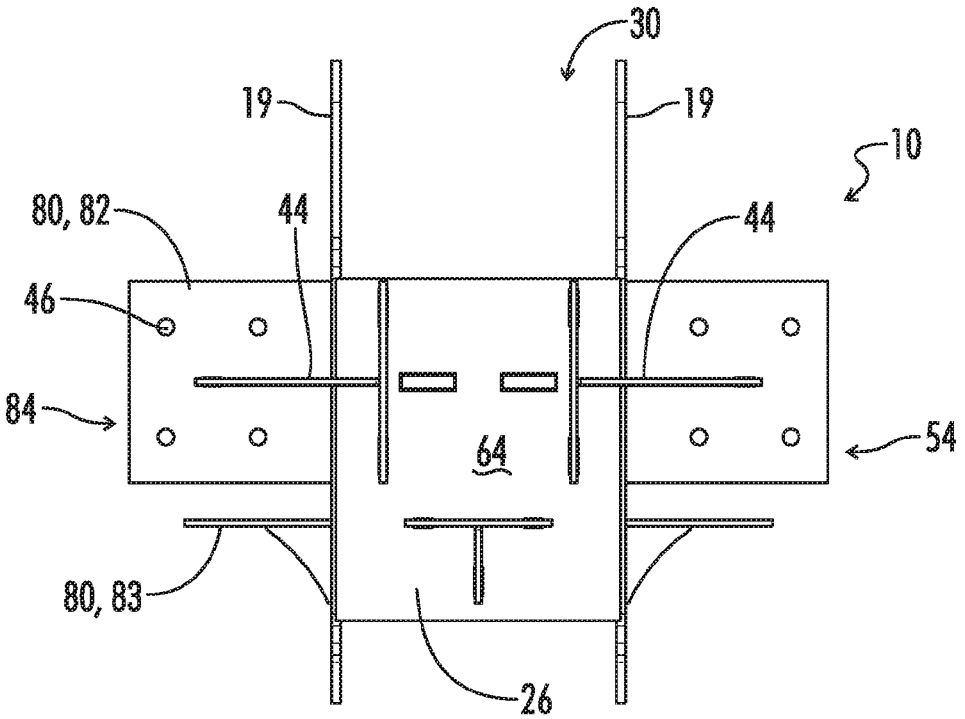
FIG. 7B is a front view of the connection device shown in FIG. 7.
Figure 7C:
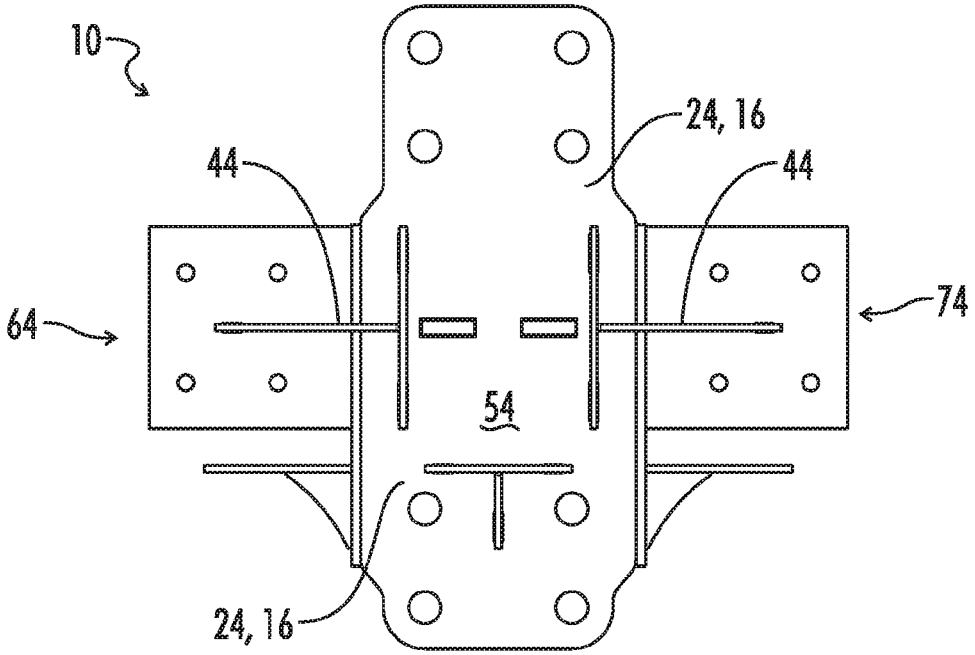
FIG. 7C is a side view of the connection device shown in FIG. 7.
Figure 7D:
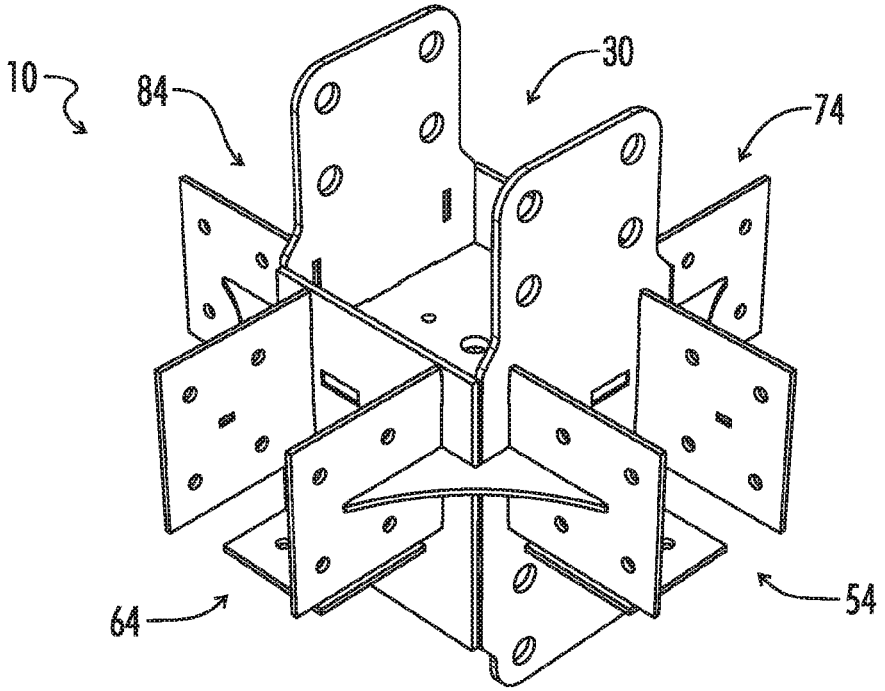
FIG. 7D is an alternate front perspective view of the connection device shown in FIG. 7.
Figure 7E:
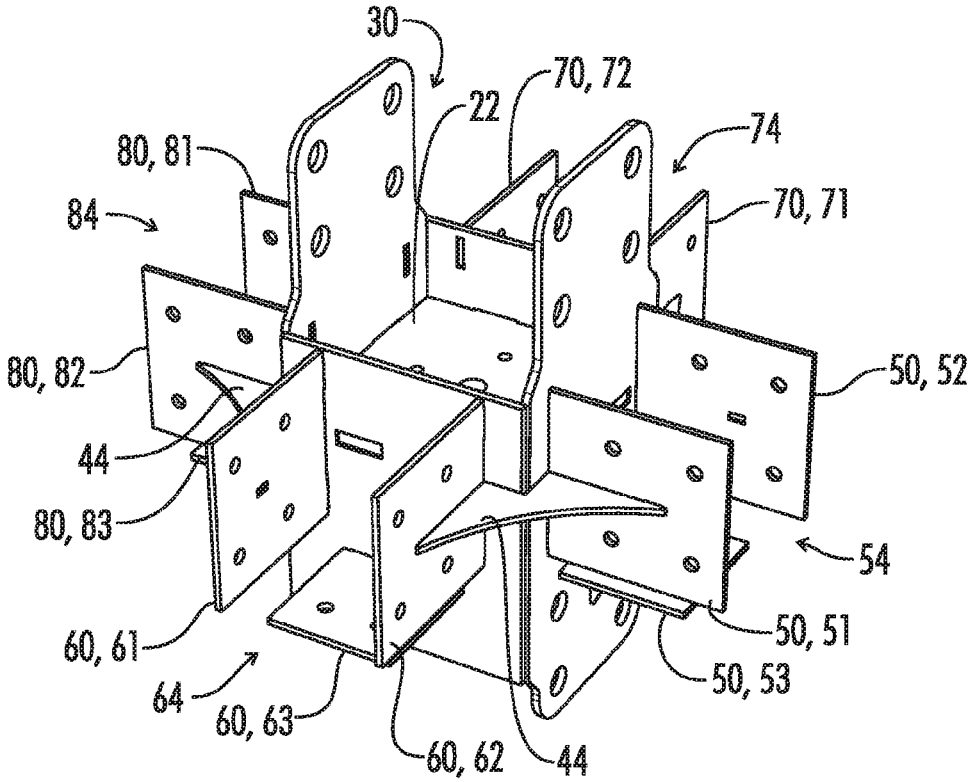
FIG. 7E is another alternate front perspective view of the connection device shown in FIG. 7.
Figure 7F:
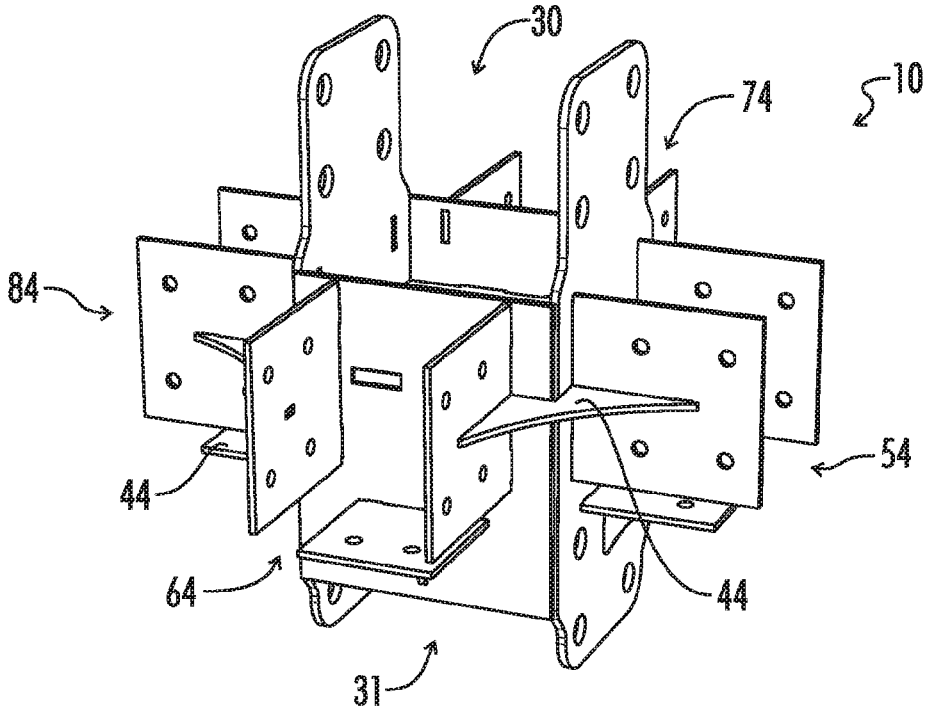
FIG. 7F is another alternate front perspective view of the connection device shown in FIG. 7.
Figure 7G:
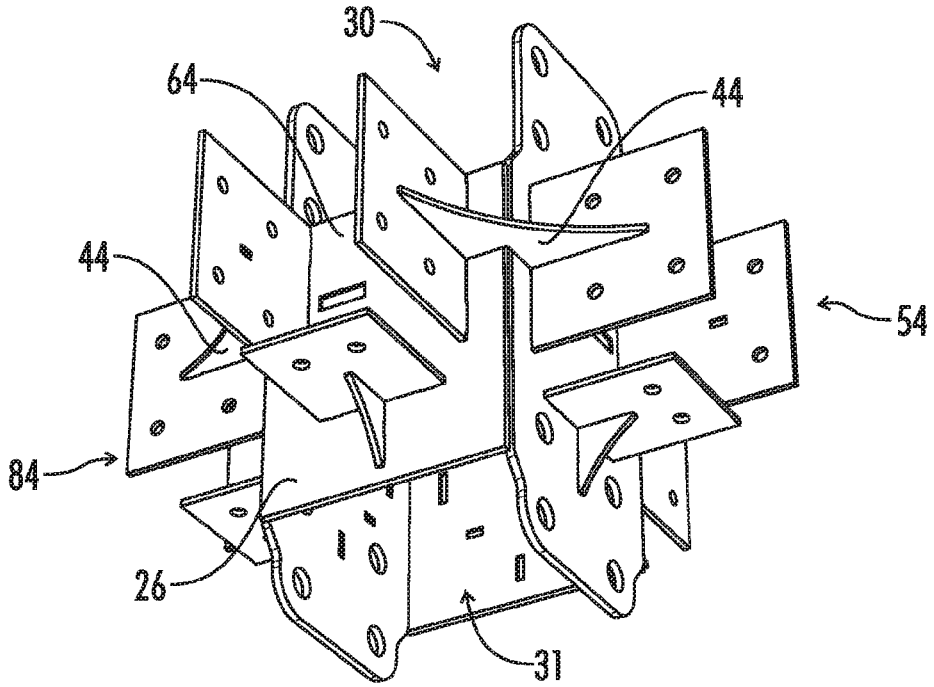
FIG. 7G is a bottom perspective view of the connection device shown in FIG. 7.
Figure 7H:
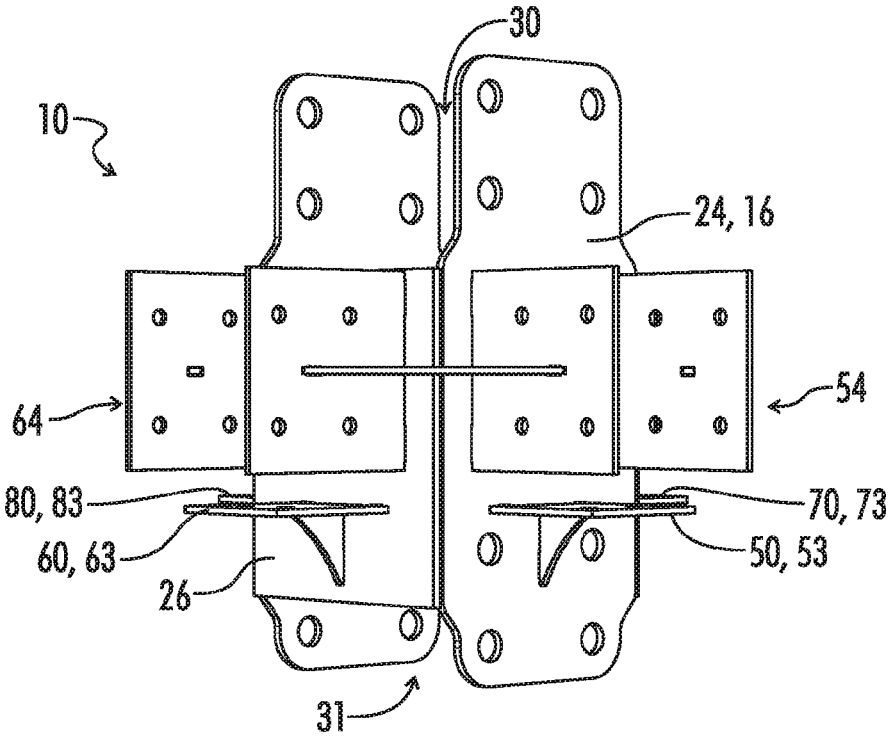
FIG. 7H is a side perspective view of the connection device shown in FIG. 7.
Figure 7I:
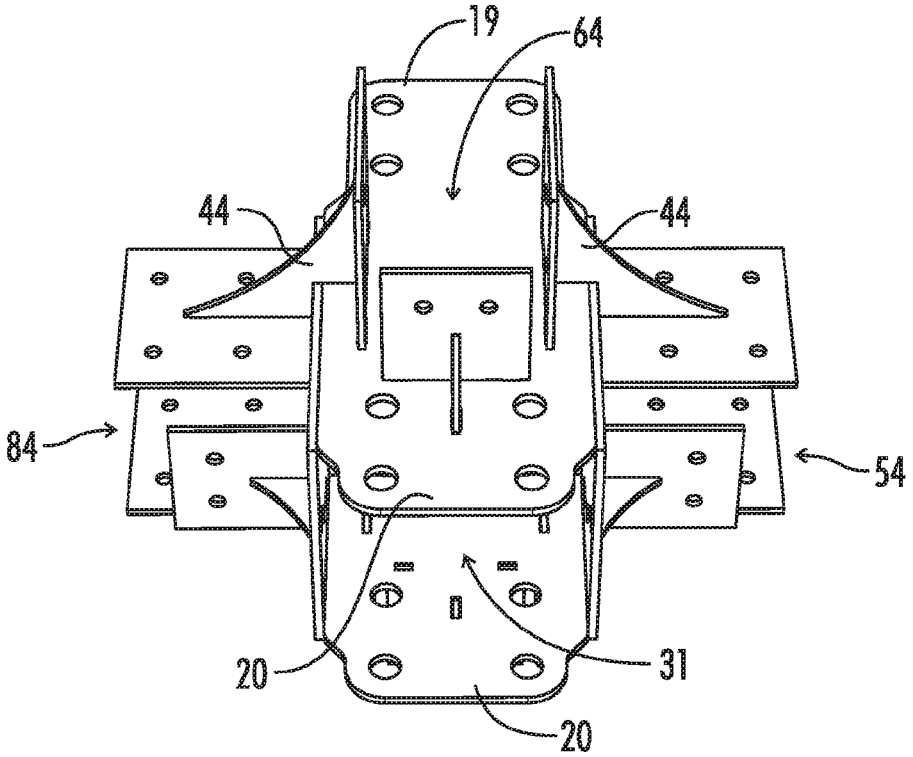
FIG. 7I is an alternate bottom perspective view of the connection device shown in FIG. 7.
Figure 8:
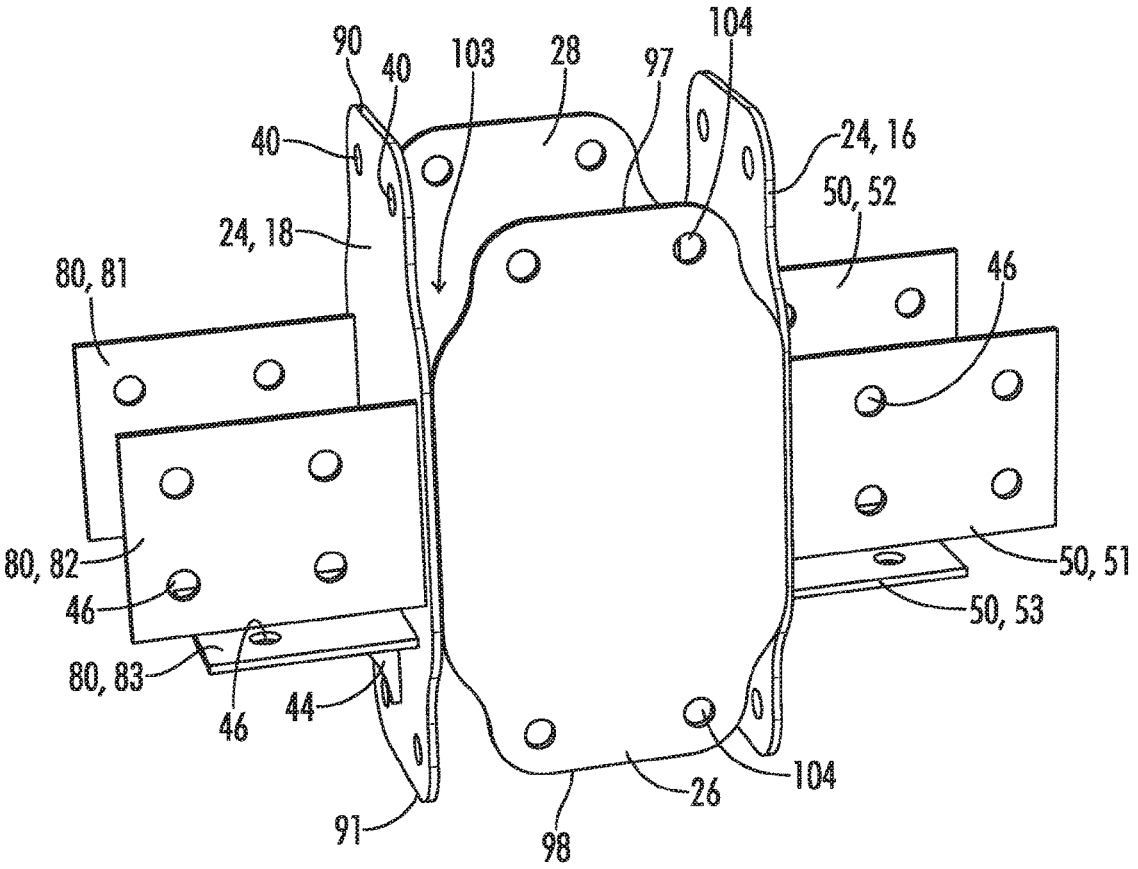
FIG. 8 is a perspective view of a connection device made in accordance with the current disclosure and having two side connection areas.
Figure 8A:
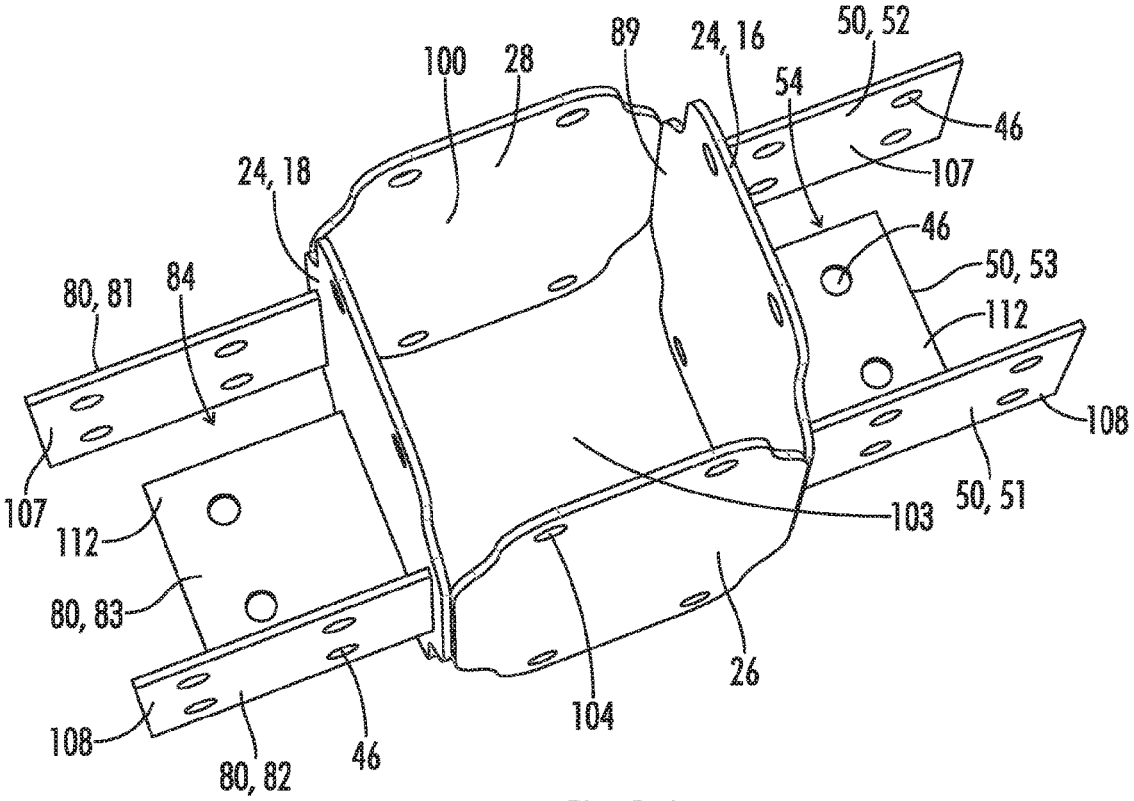
FIG. 8A is another perspective view of the connection device shown in FIG. 8.
Figure 8B:
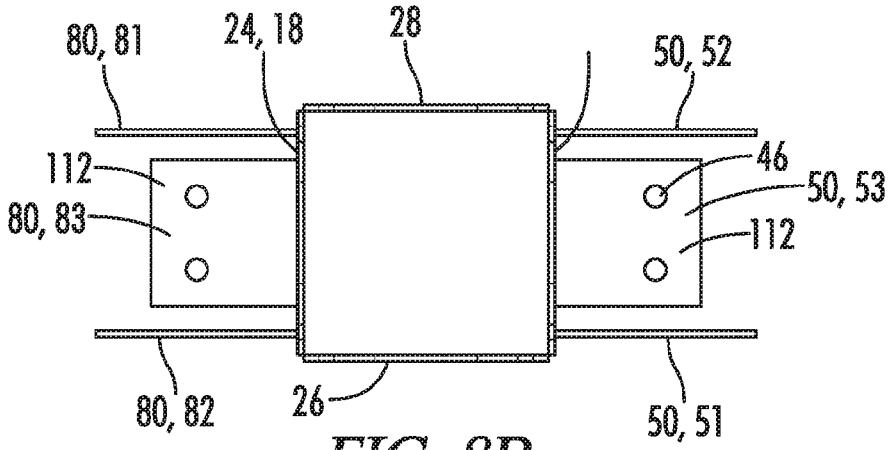
FIG. 8B is a top plan view of the connection device shown in FIG. 8.
Figure 8C:
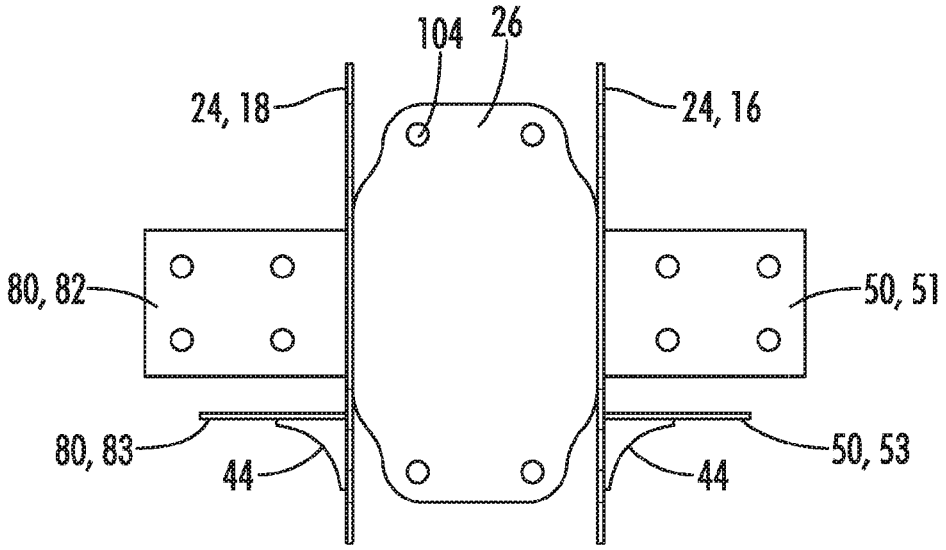
FIG. 8C is a side elevation view of the connection device shown in FIG. 8.
Figure 8D:
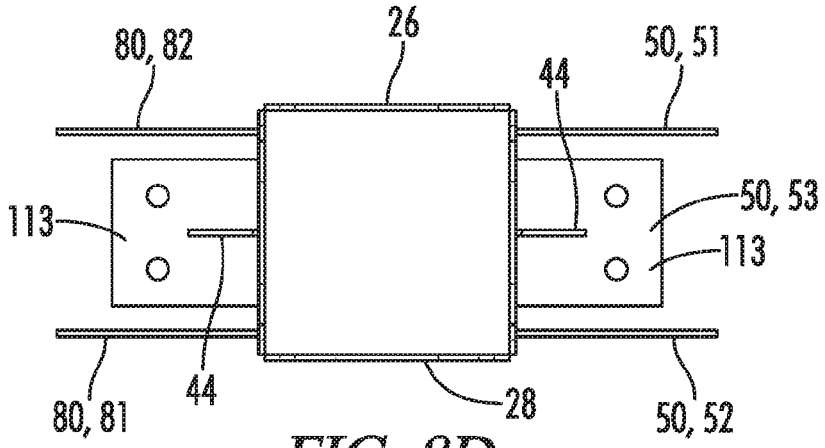
FIG. 8D is a bottom plan view of the connection device shown in FIG. 8.

The connection device 10 may include a plate 22 and a plurality of side supports 24 attached to the plate 22. The plate 22 may be oriented horizontal (i.e., parallel to the ground). In some embodiments, a first side support 16 and a second side support 18, which may be opposite the first side support 16, may be attached to the plate 22 and may extend from the plate 22 in multiple directions. Preferably, the side supports 24 include a top portion 19 and a bottom portion 20 that extend from the plate 22 in a first direction and a second direction, respectively, with the second direction substantially opposite the first direction (e.g. up and down, left and right, front and back, etc.). In the embodiment of FIGS. 8-8D, a plate is not included. The first and second side supports 16 and 18 may each have a front 85, a rear 86, a width 87 extending from the front 85 to the rear 86, a top 90, a bottom 91, a height 92 extending from the top 90 to the bottom 91 and generally perpendicular to the width 87, an interior surface 89, an exterior surface 88, and a thickness 93 extending from the interior surface 89 to the exterior surface 88 and generally perpendicular to the height 92 and width 87. Optionally, for each side support 16 and 18, the thickness 93 is less than the height 92 and width 87. Optionally, for each side support 16 and 18, the height 92 is generally aligned with the upright/vertical beam 12A. Optionally, the interior surfaces 89 of the first and second side support 16 and 18 face each other.

A first guide 26 and second guide 28 can both be attached to the plate 22 and extend away from the plate 22 if a plate is present. Preferably, the first guide 26 and the second guide 28 are also attached to each side support 24. Each guide 26, 28 can include a top portion 27 extending from the plate 22 in the first direction and a bottom portion 29 extending from the plate 22 in the second direction. The first and second guides 26 and 28 may each have a left side 94, a right side 95, a length 96 extending from the left side 94 to the right side 95, a top 97, a bottom 98, a height 99 extending from the top 97 to the bottom 98 and generally perpendicular to the length 96 and generally parallel to the side support heights 92, an interior surface 100, an exterior surface 101, and a thickness 102 extending from the interior surface 100 to the exterior surface 101 and generally perpendicular to the height 99 and length 96. Optionally, for each guide 26 and 28, the length 96 of the guide 26 and 28 is generally parallel to the first and second side support thicknesses 93. Optionally, for each guide 26 and 28, the thickness 102 is less than the height 99 and length 96. Optionally, for each guide 26 and 28, the height is generally aligned with the upright/vertical beam 12A. Optionally, the interior surfaces 100 of the guides 26 and 28 face each other.

In the embodiments of FIGS. 1-7I, the plate 22, the top portions 19 of the first and second side supports 16 and 18, the top portion 27 of the first guide 26, and the top portion 27 of the second guide 28 may define a top cavity 30 that is shaped to accept one of the beams 12. Further, the plate 22, the bottom portions 20 of the first and second side supports 16 and 18, the bottom portion 29 of the first guide 26, and the bottom portion 29 of the second guide 28 may define a bottom cavity 31 that is shaped to accept one of the beams 12A, 12B. These cavities 30 and 31 facilitate attachment of the beams 12 into the connection device 10. The top cavity 30 may have an open top and may receive an upper upright/vertical beam 12A and the bottom cavity 31 may have an open bottom and may receive a lower upright/vertical beam 12A. In some embodiments, a plate is not present, as in FIG. 8-8D, in which case, the first and second side supports 16 and 18 and the first and second guides 26 and 28 may define a single cavity 103 that may have an open top and an open bottom, in which case the connection device 10 may act as a sleeve surrounding a single upright/vertical beam 12A. The interior surfaces 89 of the first and second side supports 16 and 18 and the interior surfaces 100 of the first and second guides 26 and 28 may face the cavities 30, 31, and 103. The cavities 30, 31, and 103 may be hollow. The cavities 30, 31, and 103 may be generally rectangular in shape.

In a preferred embodiment, the plate 22 if present includes a plurality of plate openings/fastener apertures 34. These openings/fastener apertures 34 facilitate the attachment of the connection device 10 to an upright beam 12A. For example, the plate openings 34 allow the insertion of fasteners (not shown) through the plate 22 of the connection device 10 into the upright beams 12A. These fasteners can be nut and bolt type fasteners, threaded bars and nuts, nails, or other fasteners as known in the art. In another embodiment, the plate 22 is configured to facilitate the attachment of the connection device 10 to the upright beam 12A by weakened areas [35] (not shown) instead of plate openings/fastener apertures 34 such that a fastener may be driven through the weakened areas[35]. The weakened areas [35] may be formed by, for example, perforating the plate 22 or by constructing a plate 22 to be thin, thus easily pierceable, in a given area. The plate 22 may be generally rectangular in shape.

The side supports 16 and 18 may have variable widths 87—i.e., the widths 87 vary along the side support heights 92, as seen throughout the drawings. For example, the top portion 19 of each side support 24 can include at least one indented side 38 and preferably two indented sides 38. The bottom portions 20 of each side support 24 can include at least one indented side 36 and preferably two indented sides 36. The start of the inset of the indented side 38 can begin proximate the plate 22. Alternately, the inset of the indented side 38 can begin proximate either the first guide 26 or second guide 28 depending upon the location of the indented side 38 of the particular side support 24. For each side support 24, the indented sides 38 of the top portion 19 of that side support 24 may be longer than the indented sides 36 of the bottom portion 20 of that side support 24. The guides 26 and 28 may likewise have variable lengths 96—i.e., the lengths 96 may vary along the guide heights 99. The first and second side supports 16 and 18 may be mirror images of each other and the first and second guides 26 and 28 may be mirror images of each other. The heights 92 of the first and second side supports 16 and 18 may be greater than the heights 99 of the first and second guides 26 and 28. If a plate 22 is included, the lengths 96 of the guides 26 and 28 may be generally parallel to the plate length 116 and the widths 87 of the side supports 16, 18 may be generally parallel to the plate width 117.

The side supports 24 can further include a plurality of side support openings/fastener apertures 40 that extend from the side support interior surface 89 to the side support exterior surface 88 and operate with fasteners 42 to secure one of the beam 12A to the side supports 24 and thus the connection device 10 to the upright beam(s) 12A. Preferably the side support openings/fastener apertures 40 on oppositely positioned side supports 24 are aligned. This further facilitates the use of fasteners 42 to secure the connection device 10 to a beam 12A. In another embodiment, the side supports 24 are configured to facilitate the attachment of the connection device 10 to the upright beam(s) 12A by weakened areas [35] (not shown). The weakened areas [35] may be configured to allow the fastener 42 to pass through them when a driving force is applied. These fasteners 42 can be nut and bolt type fasteners, threaded bars and nuts, nails, or other fasteners as known in the art to secure connection devices and beams. The guides 26 and 28 may also include aligned fastener apertures 104 that extend from the guide exterior surface 101 to the guide interior surface 100 and/or weakened areas [35] to allow fasteners 42 to secure the upright/vertical beam(s) 12A. One guide 26 or 28 may connect the fronts 85 of the first and second side supports 16 and 18 and the other of guide 26 or 28 may connect the rears 86 of the first and second side supports 16 and 18.

The connection device 10 can further include one or multiple sets 50, 60, 70, and 80 of first, second, and third side attachments 51/61/71/81, 52/62/72/82, and 53/63/73/83 respectively. Each side attachment 51-53, 61-63, 71-73, and 81-83 may extend from one of the side supports 16 and 18 or guides 26 and 28 in a direction substantially perpendicular to that side support 16 and 18 or guide 26 and 28 and may form a side connection area 54/64/74/84. The side connection areas 54/64/74/84 may be hollow and may be configured to receive a lateral beam 12B. The side attachments 51-53, 61-63, 71-73, and 81-83 may extend from the exterior surfaces 88 and 101 of the respective side support 16 and 18 or guide 26 and 28 away from the cavit(ies) 30, 31 and 103. The first, second, and third side attachments 51/61/71/81, 52/62/72/82, and 53/63/73/83 may have a height 105 generally parallel to the side support and guide heights 92 and 99. If the first and second side attachments 51/61/71/81 and 52/62/72/82 are located on the side supports 16 and 18, the first and second side attachments 51/61/71/81, 52/62/72/82 may have a length 106 generally parallel to the side support thickness 93 (and the guide lengths 96), an interior surface 107, an exterior surface 108, and a thickness 109 extending from the interior surface 107 to the exterior surface 108 generally parallel to the side support widths 87 (and the guide thickness 102). For each of the first and second side attachments 51/61/71/81 and 52/62/72/82, the thickness 109 may be less than the length 106. If the first and second side attachments 51/61/71/81 and 52/62/72/82 are located on the exterior surfaces 101 of the guides 26 and 28, the first and second side attachments 51/61/71/81 and 52/62/72/82 may have a width 110 generally parallel to the guide thickness 102 and the side support widths 87 and a thickness 109 generally parallel to the guide lengths 96 (and the side support thicknesses 93). The first and second side attachments 51/61/71/81 and 52/62/72/82 may define sides of the respective side connection areas 54/64/74/84 and the third side attachments 53/63/73/83 may define bottoms of the respective side connection areas 54/64/74/84, and the side connection areas 54/64/74/84 may have open tops. The third side attachments 53/63/73/83 may be oriented generally perpendicular to the first and second side supports 16 and 18, the first and second guides 26 and 28 and the first and second side attachments 51/61/71/81 and 52/62/72/82. The third side attachment 53/63/73/83 may have a length 111 that is generally parallel to the first and second side attachment lengths 106 (if the first, second and third side attachments 51/61/71/81, 52/62/72/82, and 53/63/73/83 are located on a side support 16 and 18), a width 114 that is generally parallel to the first and second side attachment widths 110 (if the first, second and third side attachments 51/61/71/81, 52/62/72/82, and 53/63/73/83 are located on a guide 26 and 28). The third side attachment 53/63/73/83 may have an exterior/bottom surface 113, an interior/top surface 112, and the third side attachment height/thickness 115 may extend from the exterior/bottom surface 113 to the interior/top surface 112. If the third side attachment 53/63/73/83 is located on a side support 16 and 18, the third side attachment height/thickness 115 may be less than the length 111 of the third side attachment 53/63/73/83. If the third side attachment 53/63/73/83 is located on a guide 26 and 28, the third side attachment height/thickness 115 may be less than the width 114 of the third side attachment 53/63/73/83. The interior surfaces 107 of the first, second and third side attachments 51/61/71/81, 52/62/72/82, and 53/63/73/83 may face the respective connection areas 54, 64, 74, 84. The third side attachments 53/63/73/83 may be located below and not attached to the first and second side attachments 51/61/71/81 and 52/62/72/82. The lateral beams 12B may be placed on top of the top/interior surface 112 of the third side attachments 53/63/73/83 between the first and second side attachments 51/61/71/81 and 52/62/72/82. The side connection areas 54, 64, 74, and 84 may be generally rectangular in shape.

The first, second, third and fourth sets 50, 60, 70, and 80 of side attachments are positioned to accept the lateral beams 12B to facilitate attachment of a lateral beam 12B to the connection device 10. For example, the first, second, third, and fourth side connection areas 54, 64, 74, and 84 are shaped to individually accept one of the lateral beams 12B. The adjacent side attachments of the first, second, third and fourth sets 50, 60, 70 and 80 of side attachments can include a reinforcement/brace 44 to further facilitate positioning of these side attachments and support of the lateral beams 12B positioned in those adjacent side connection areas 54, 64, 74, and 84. For example, a bottom reinforcement/brace 44 may extend between the exterior surface 88 or 101 of the side support or guide 16, 18, 26, or 28 and the exterior surface 113 of the third side attachment 53, 63, 73 or 83. A lateral reinforcement/brace 44 may extend between adjacent first or second side attachments 51, 52, 61, 62, 71, 72, 81 and 82 of different sets 50, 60, 70 and 80 of side attachments.

The first, second, third, and fourth sets 50, 60, 70 and 80 of side attachments can further include a plurality of openings/fastener apertures 46 that extend from the interior surface 107 or 112 to the exterior surface 108 or 113 of the respective side attachment and operate with fasteners 43 to secure one of the lateral beams 12B to that side connection area 54/64/74/84 and thus the connection device 10 to one of the lateral beams 12B. Preferably the side attachment openings/fastener apertures 46 on oppositely positioned first and second side attachments 51, 52; 61, 62; 71, 72; or 81, 82 are aligned. This further facilitates the use of fasteners 43 to secure the connection device 10 to one of the lateral beams 12B. In another embodiment, first, second, third, and fourth sets 50, 60, 70 and 80 of side attachments are configured to facilitate the attachment of the connection device 10 to the beams 12B by weakened areas [35] (not shown). The weakened areas [35] may be configured to allow the fastener 42 to pass through them when a driving force is applied. These fasteners 42 can be nut and bolt type fasteners, threaded bars and nuts, nails, or other fasteners as known in the art to secure connection devices and beams.

The number of fastener/apertures openings, including plate fastener apertures/openings 34, side support fastener apertures/openings 40, guide fastener apertures/openings 104 and side attachment fastener apertures/openings 46 in the sets 50, 60, 70, and 80 of side attachments can vary as desired. Preferably there are enough fastener apertures/openings in the particular area to properly secure the connection device 10 to one of the beams 12A, 12B without having too many of these openings so as to interfere with the actual structural integrity of the connection device 10. Except for the fastener apertures/openings located in the third side attachments 53, 63, 73 and 83, the fastener aperture/openings 34, 40, 104 and 46 are preferably between the top and bottom of the component that includes the fastener aperture/openings 34, 40, 104 and 46 (e.g., between the top 90 and bottom 91 of the side supports 16, 18, between the tops 97 and bottoms 98 of the guides 26 and 28 and between the top and bottom of the first and second side attachments 51, 52, 61, 62, 71, 72, 81, and 82).

The openings/fastener apertures 34, 40, 104 and 46 described herein may be round. The first and second guides 26 and 28, the first and second side supports 16 and 18 and the first, second and third side attachments 51/61/71/81, 52/62/72/82, and 53/63/73/83 may be in the form of plates and may have generally flat interior and exterior surfaces 88, 89, 100, 101, 107, 108, 112 and 113. The guide and side support fastener apertures 40 and 104 are preferably located above the tops of the first second, and third side attachments 51/61/71/81, 52/62/72/82, and 53/63/73/83 and/or below the bottoms of the first and second side attachments 51/61/71/81 and 52/62/72/82 (and optionally below the third side attachment 53, 63, 73, and 83), as best seen in FIGS. 3, 4, 5, 6, 7 and 8.

Thus, although there have been described particular embodiments of the present invention of a new and useful Multiple Port Beam Bracket it is not intended that such references be construed as limitations upon the scope of this invention except as set forth in the following claims.

PARTS LIST

| | |
|---|---|
| connection device | 10 |
| upright beam | 12A |
| lateral beam | 12B |
| first side support | 16 |
| second side support | 18 |
| side support top portions | 19 |
| side support bottom portions | 20 |
| Plate | 22 |
| side support | 24 |
| first guide | 26 |
| second guide | 28 |
| guide top portion | 27 |
| guide bottom portion | 29 |
| top cavity | 30 |
| bottom cavity | 31 |
| plate openings/fastener apertures | 34 |
| weakened areas | [35] *not shown* |
| top portion indented side | 38 |
| bottom portion indented side | 36 |
| side support openings/fastener apertures | 40 |
| Fasteners | 42 |
| Fasteners | 43 |
| brace | 44 |
| side attachment openings/fastener apertures | 46 |
| first set | 50 |
| first set first side attachment | 51 |
| first set second side attachment | 52 |
| first set third side attachment | 53 |
| first side connection area | 54 |
| second set | 60 |
| second set first side attachment | 61 |
| second set second side attachment | 62 |
| second set third side attachment | 63 |
| second side connection area | 64 |
| third set | 70 |
| third set first side attachment | 71 |
| third set second side attachment | 72 |
| third set third side attachment | 73 |
| fourth set | 80 |
| fourth set first side attachment | 81 |
| fourth set second side attachment | 82 |
| fourth set third side attachment | 83 |
| fourth side connection area | 84 |
| side support front | 85 |
| side support rear | 86 |
| side support width | 87 |
| side support exterior surface | 88 |
| side support interior surface | 89 |
| side support top | 90 |
| side support bottom | 91 |
| side support height | 92 |
| side support thickness | 93 |
| guide left side | 94 |
| guide right side | 95 |
| guide length | 96 |
| guide top | 97 |
| guide bottom | 98 |
| guide height | 99 |
| guide interior surface | 100 |
| guide exterior surface | 101 |
| guide thickness | 102 |
| single cavity | 103 |
| guide openings/fastener apertures | 104 |
| first and second side attachment height | 105 |
| first and second side attachment length | 106 |
| first and second side attachment interior surface | 107 |
| first and second side attachment exterior surface | 108 |
| first and second side attachment thickness | 109 |
| first and second side attachment width | 110 |
| third side attachment length | 111 |
| third side attachment top/interior surface | 112 |
| third side attachment bottom/exterior surface | 113 |
| third side attachment width | 114 |
| third side attachment thickness | 115 |

-continued

| | |
|---|---|
| plate width | 116 |
| plate length | 117 |

What is claimed is:

1. A connection device for supporting a plurality of beams comprising:

a first side support having a first side support front, a first side support rear, a first side support width extending from the first side support front to the first side support rear, a first side support top, a first side support bottom, and a first side support height extending from the first side support top to the first side support bottom and generally perpendicular to the first side support width, a first side support interior surface, a first side support exterior surface, and a first side support thickness extending from the first side support interior surface to the first side support exterior surface and generally perpendicular to the first side support width and first side support height;

a second side support opposite the first side support and having a second side support front, a second side support rear, a second side support width extending from the second side support front to the second side support rear and generally parallel to the first side support width, a second side support top, a second side support bottom, and a second side support height extending from the second side support top to the second side support bottom and generally perpendicular to the first side support width and generally parallel to the first side support height, a second side support interior surface facing the first side support interior surface, a second side support exterior surface, and a second side support thickness extending from the second side support interior surface to the second side support exterior surface and generally perpendicular to the second side support width and second side support height;

a first guide attached to the first and second side support and oriented substantially perpendicular to the first and second side support and having a first guide left side, a first guide right side, a first guide length extending from the first guide left side to the first guide right side and generally perpendicular to the first side support width, a first guide top, a first guide bottom, and a first guide height extending from the first guide top to the first guide bottom and generally perpendicular to the first guide length and generally parallel to the first side support height, a first guide interior surface, a first guide exterior surface, and a first guide thickness extending from the first guide interior surface to the first guide exterior surface and generally perpendicular to the first guide length and first guide height;

a second guide attached to the first and second side support and located opposite the first guide and having a second guide left side, a second guide right side, a second guide length extending from the second guide left side to the second guide right side and generally perpendicular to the first side support width, a second guide top, a second guide bottom, and a second guide height extending from the second guide top to the second guide bottom and generally perpendicular to the second guide length and generally parallel to the first side support height, a second guide interior surface facing the first guide interior surface, a second guide exterior surface, and a second guide thickness extending from the second guide interior surface to the second guide exterior surface and generally perpendicular to the second guide length and second guide height;

wherein the first and second guide lengths are generally parallel to the first and second side support thicknesses[;], wherein the interior surfaces of the first side support, the second side support, the first guide and the second guide define a first cavity, the first cavity having an open top and configured to receive an upright beam, wherein at least one of the first side support, second side support, first guide and second guide comprise at least one fastener aperture extending through the thickness of the first side support, second side support, first guide or second guide, [and]

wherein the first side support exterior surface comprises a first set of first, second, and third side attachments extending away from the first cavity, each of the first, second and third side attachments of the first set comprising an interior surface[and], an exterior surface, *and a thickness extending from the interior surface to the exterior surface*, wherein the first and second side attachments of the first set are oriented generally perpendicular to the first side support and generally parallel to the first and second guides, and each have a height generally parallel to the first side support height and a length generally parallel to the first and second guide lengths and the first side support thickness, wherein the first side attachment of the first set is opposite the second side attachment of the first set, wherein the interior surfaces of the first and second side attachments of the first set face each other, wherein the third side attachment of the first set is oriented generally perpendicular to the first side support, the first and second guides, and the first and second side attachments, and has a length generally parallel to the first and second guide lengths and the first side support thickness, wherein the interior surfaces of the first, the second and the third side attachments of the first set define a first side connection area configured to receive a lateral beam, wherein the first side connection area has an open top[;], wherein the interior surfaces of the first and second side attachments of the first set define sides of the first side connection area and the interior surface of the third side attachment of the first set defines the bottom of the first side connection area, wherein the interior surface of the third side attachment is located above the exterior surface of the third side attachment,

[and further] wherein at least one of the first[,] *or* second [and third] side attachments of the first set comprise at least one side attachment fastener aperture extending through the thickness of the first[,] *or* second [or third] side attachment,

*wherein the third side attachment of the first set comprises at least one side attachment fastener aperture oriented perpendicular to the at least one side attachment fastener aperture of the first and second side attachment and extending through the thickness of the third side attachment, and*

*further wherein the connection device further comprises a bottom brace located below the third side attachment of the first set and extending between the exterior surface of the third side attachment of the first set and the first side support exterior surface.*

[2. The connection device of claim 1 wherein the connection device further comprises a brace extending between the exterior surface of the third side attachment of the first set and the first side support exterior surface.]

3. [The] *An assembly comprising the* connection device of claim 1 wherein an upright beam is positioned in the first cavity, wherein a first fastener is positioned through the least one fastener aperture of the first side support, second side support, first guide or second guide and into the upright beam, wherein a lateral beam is positioned in the first side connection area, and further wherein a second fastener is positioned through the at least one side attachment fastener aperture of the first[,] *or* second [or third] side attachments of the first set and into the lateral beam, *wherein a third fastener is positioned through the at least one side attachment fastener aperture of the third side attachment of the first set and into the lateral beam,* and further wherein the lateral beam rests on the interior surface of the third side attachment and between the interior surfaces of the first and second side attachments.

4. [The] *An assembly comprising the* connection device of claim 3 wherein the lateral beam is oriented generally perpendicular to the heights of the first side support, the second side support, the first guide and the second guide and the upright beam is oriented generally parallel to the heights of the first side support, the second side support, the first guide and the second guide.

5. The connection device of claim 1 wherein [the first and second side supports comprise at least one aligned fastener aperture] *the first and second side attachments of the first set each comprise a bottom located above and adjacent to the third side attachment of the first set, and further wherein the first and second side attachments of the first set are not attached to the third side attachment of the first set.*

6. The connection device of claim 1 wherein the third side attachment of the first set is located below and not attached to the first and second side attachments of the first set.

7. The connection device of claim 1 wherein the at least one fastener aperture, *the at least one side attachment fastener aperture of the first side or second side attachment* and the at least one side attachment fastener aperture *of the third side attachment* are round.

8. The connection device of claim 1 wherein the first and second side supports have a variable width.

9. The connection device of claim 1 wherein the first cavity and the first side connection area are generally rectangular in shape.

10. The connection device of claim 1 wherein the first and second side supports are mirror images of each other.

11. The connection device of claim 1 wherein [the first and second guides are mirror images of each other] *the first, second and third side attachments are rectangular plates that are not attached to each other.*

12. The connection device of claim 1 wherein the first cavity and the first side connection area are hollow.

[13. The connection device of claim 1 wherein the heights of the first and second side supports are greater than the heights of the first and second guides.]

14. The connection device of claim 1 wherein the interior and exterior surfaces of the first and second guides, the first and second side supports, and the first, second, and third side attachments of the first set are generally flat.

15. The connection device of claim 1 wherein the exterior surface of the second side support further comprises a second set of first, second, and third side attachments extending away from the first cavity, each of the first, second and third side attachments of the second set comprising an interior surface and an exterior surface, wherein the first and second side attachments of the second set are oriented generally perpendicular to the second side support and generally parallel to the first and second guides, and each have a height generally parallel to the second side support height and a length generally parallel to the first and second guide lengths and the second side support thickness, wherein the first side attachment of the second set is opposite the second side attachment of the second set, wherein the interior surfaces of the first and second side attachments of the second set face each other, wherein the third side attachment of the second set is oriented generally perpendicular to the second side support and first and second guides and has a length generally parallel to the first and second guide lengths and the second side support thickness, wherein the interior surfaces of the first, the second and the third side attachments of the second set define a second side connection area configured to receive a lateral beam, wherein the interior surfaces of the first and the second side attachments of the second set define sides of the second side connection area and the interior surface of the third side attachment of the second set defines the bottom of the second side connection area, and further wherein at least one of the first, second and third side attachments of the second set comprise at least one side attachment fastener aperture extending through the first, second or third side attachment thickness, and wherein the second side connection area has an open top.

16. [The] *An assembly comprising the* connection device of claim 15 wherein an upright beam is positioned in the first cavity, wherein a first fastener is positioned through the least one fastener aperture of the first side support, second side support, first guide or second guide and into the upright beam, wherein a first lateral beam is positioned in the first side connection area, wherein a second fastener is positioned through the at least one side attachment fastener aperture of the first, second or third side attachments of the first set and into the first lateral beam, wherein a second lateral beam is positioned in the second side connection area, wherein a third fastener is positioned through the at least one side attachment fastener aperture of the first, second or third side attachments of the second set and into the second lateral beam, wherein the first lateral beam rests on the interior surface of the third side attachment of the first set, and further wherein the second lateral beam rests on the interior surface of the third side attachment of the second set.

[17. The connection device of claim 1 wherein the exterior surface of the first guide further comprises a second set of first, second, and third side attachments extending away from the first cavity, each of the first, second and third side attachments of the second set comprising an interior surface and an exterior surface, wherein the first and second side attachments of the second set are oriented generally perpendicular to the first guide and generally parallel to the first and second side supports, and each have a height generally parallel to the first guide height and a length generally parallel to the first and second side support widths and the first guide thickness, wherein the first side attachment of the second set is opposite the second side attachment of the second set, wherein the interior surfaces of the first and second side attachments of the second set face each other, wherein the third side attachment of the second set is oriented generally perpendicular to the first guide and the first and second side supports and has a length generally parallel to the first and second side support widths and the first guide thickness, wherein the interior surfaces of the first, the second and the third side attachments of the second set define a second side connection area configured to receive a lateral beam, wherein the interior surfaces of the first and second side attachments of the second set define sides of the second side connection area and the interior surface of the third side attachment of the second set defines the bottom of the second side connection area, and further wherein at least one of the first, second and third side attachments of the second set comprise at least one side attachment fastener aperture extending through the first, second or third side attachment thickness, and wherein the second side connection area has an open top.]

[18. The connection device of claim 17 wherein an upright beam is positioned in the first cavity, wherein a first fastener is positioned through the least one fastener aperture of the first side support, second side support, first guide or second guide and into the upright beam, wherein a first lateral beam is positioned in the first side connection area, wherein a second fastener is positioned through the at least one side attachment fastener aperture of the first, second or third side attachments of the first set, and into the first lateral beam, wherein a second lateral beam is positioned in the second side connection area, wherein a third fastener is positioned through the at least one side attachment fastener aperture of the first, second or third side attachments of the second set and into the second lateral beam, wherein the first lateral beam rests on the interior surface of the third side attachment of the first set, and further wherein the second lateral beam rests on the interior surface of the third side attachment of the second set.]

19. The connection device of claim 1 wherein, for each side support, the thickness of the side support is less than the width of the side support.

20. The connection device of claim 1 further comprising a plate extending between the guides and the side supports, the plate comprising a plate width generally parallel to the side support widths, a plate length generally parallel to the guide lengths, a plate top, a plate bottom, and a plate thickness extending from the plate top to the plate bottom and generally perpendicular to the plate length and plate width, the plate positioned between the tops and bottoms of the guides and side supports, wherein the plate bottom, *and* the interior surfaces of the first side support, the second side support, the first guide and the second guide define a second cavity, the second cavity located below the first cavity, the second cavity having an open bottom.

21. [The] *An assembly comprising the* connection device of claim 20 wherein a top upright beam is positioned in the first cavity and a bottom upright beam is positioned in the second cavity.

*22. An assembly comprising the connection device of claim 21 wherein the plate comprises a plurality of plate apertures configured to attach the plate to at least one of the top upright beam or bottom upright beam.*

* * * * *